United States Patent [19]

Yamashita et al.

[11] Patent Number: 5,701,505
[45] Date of Patent: Dec. 23, 1997

[54] IMAGE DATA PARALLEL PROCESSING APPARATUS

[75] Inventors: Shigeki Yamashita; Yoshiyuki Hirayama; Kazuhiro Suzuki, all of Saitama, Japan

[73] Assignee: Fuji Xerox Co., Ltd., Tokyo, Japan

[21] Appl. No.: 412,214

[22] Filed: Mar. 27, 1995

Related U.S. Application Data

[63] Continuation of Ser. No. 119,628, Sep. 13, 1993, abandoned.

[30] Foreign Application Priority Data

Sep. 14, 1992 [JP] Japan .................. 4-244578

[51] Int. Cl.$^6$ .................................................. G06F 15/00
[52] U.S. Cl. ................ 395/800; 364/920.7; 364/237.82; 358/514; 382/304
[58] Field of Search .................. 395/800; 364/DIG. 1, 364/DIG. 2, 920.7, 237.82; 358/514; 382/304

[56] References Cited

U.S. PATENT DOCUMENTS

| | | | |
|---|---|---|---|
| 4,052,669 | 10/1977 | Micka et al. | 340/146.3 |
| 4,484,349 | 11/1984 | McCubbrey | 382/49 |
| 4,786,820 | 11/1988 | Ogino et al. | 250/378 |
| 4,786,976 | 11/1988 | Takao et al. | 358/283 |
| 4,805,227 | 2/1989 | Wehner | 382/41 |
| 4,905,294 | 2/1990 | Sugiura et al. | 382/9 |
| 4,924,509 | 5/1990 | Yokomizo | 382/50 |
| 4,949,390 | 8/1990 | Iverson et al. | 382/49 |
| 4,953,014 | 8/1990 | Takaragi | 358/77 |
| 4,978,971 | 12/1990 | Goetz et al. | 346/1.1 |
| 5,003,380 | 3/1991 | Hirota | 358/75 |
| 5,006,864 | 4/1991 | Agata et al. | 346/33 |
| 5,091,978 | 2/1992 | Hirota | 382/67 |
| 5,115,478 | 5/1992 | Sugiura | 382/50 |
| 5,117,469 | 5/1992 | Hino et al. | 382/41 |
| 5,130,820 | 7/1992 | Hirota | 358/447 |
| 5,157,765 | 10/1992 | Birk et al. | 395/163 |
| 5,193,122 | 3/1993 | Kowalski et al. | 382/9 |
| 5,253,048 | 10/1993 | Mori et al. | 358/524 |
| 5,301,039 | 4/1994 | Tanioka | 358/457 |
| 5,539,843 | 7/1996 | Murakami et al. | 382/270 |
| 5,555,107 | 9/1996 | Furada et al. | 358/518 |

*Primary Examiner*—Jack B. Harvey
*Assistant Examiner*—Valerie Darbe
*Attorney, Agent, or Firm*—Finnegan, Henderson, Farabow, Garrett & Dunner, L.L.P.

[57] ABSTRACT

One page of image data is divided into six data streams of blocks data. First to sixth FIFO memories of a speed difference absorbing circuit absorb a difference between a transfer rate of the block data and a processing speed of the subsequent circuits. FIFO memories of a line delay circuit delay the respective block data such that delay times for the respective block data change step by step by a predetermined time. An order conversion circuit produces 4-line parallel image data by sequentially selecting the block data sent from the line delay circuit. Sync signals for the four respective lines are delayed step by step by a predetermined time.

17 Claims, 25 Drawing Sheets

| | b1 | b2 | b3 | b4 | b5 | b6 |
|---|---|---|---|---|---|---|
| L1 | "1-1" | "1-2" | "1-3" | "1-4" | "1-5" | "1-6" |
| L2 | "2-1" | "2-2" | "2-3" | "2-4" | "2-5" | "2-6" |
| L3 | "3-1" | "3-2" | "3-3" | "3-4" | "3-5" | "3-6" |
| L4 | "4-1" | "4-2" | "4-3" | "4-4" | "4-5" | "4-6" |
| L5 | "5-1" | "5-2" | "5-3" | "5-4" | "5-5" | "5-6" |
| L6 | "6-1" | "6-2" | "6-3" | "6-4" | "6-5" | "6-6" |
| | " " | | " " | "7-4" | "7-5" | "7- " |

FIG. 23
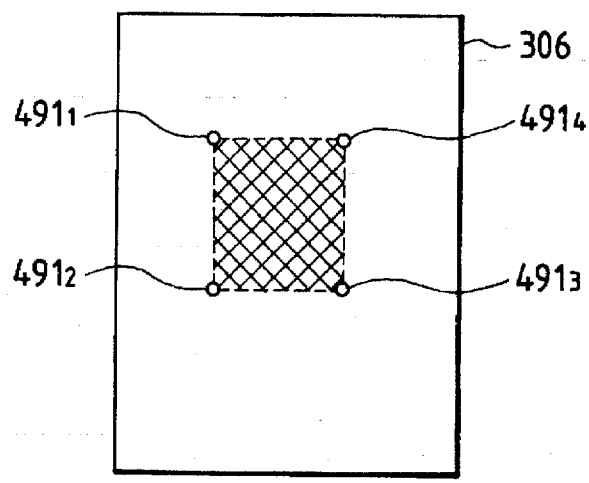
FIG. 24
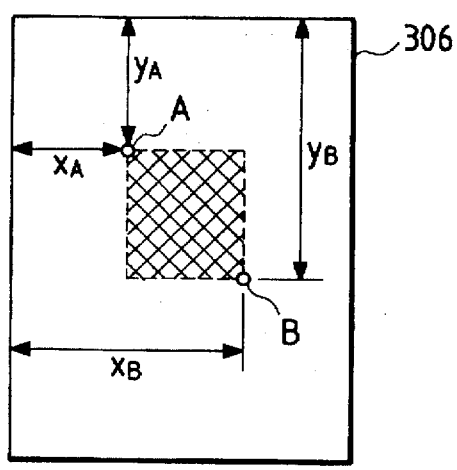
FIG. 25
(a)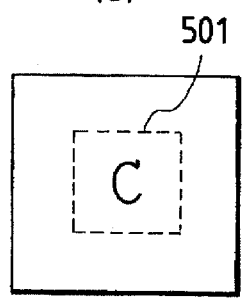 → (b)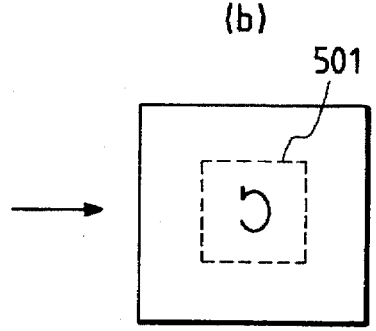

| A1 | A2 | A3 | A4 | A5 | A6 | A7 | A8 |
|----|----|----|----|----|----|----|----|
| E1 | E2 | E3 | E4 | E5 | E6 | E7 | E8 |

| B1 | B2 | B3 | B4 | B5 | B6 | B7 | B8 |
|----|----|----|----|----|----|----|----|
| F1 | F2 | F3 | F4 | F5 | F6 | F7 | F8 |

| C1 | C2 | C3 | C4 | C5 | C6 | C7 | C8 |
|----|----|----|----|----|----|----|----|
| G1 | G2 | G3 | G4 | G5 | G6 | G7 | G8 |

| D1 | D2 | D3 | D4 | D5 | D6 | D7 | D8 |
|----|----|----|----|----|----|----|----|
| H1 | H2 | H3 | H4 | H5 | H6 | H7 | H8 |

811 PIXEL UNDER ATTENTION

|      | bD1   | bD2   | bD3   | bD4   |
|------|-------|-------|-------|-------|
| L1   | "1-1" | "1-2" | "1-3" | "1-4" |
| L2   | "2-1" | "2-2" | "2-3" | "2-4" |
| L3   | "3-1" | "3-2" | "3-3" | "3-4" |
| L4   | "4-1" | "4-2" | "4-3" | "4-4" |
| L5   | "5-1" | "5-2" | "5-3" | "5-4" |
| L6   | "6-1" | "6-2" | "6-3" | "6-4" |
|      |       | ""    | "7-3" | "7-4" |

IMAGE DATA PARALLEL PROCESSING APPARATUS

This application is a continuation of application Ser. No. 08/119,628 filed Sep. 13, 1993, now abandoned.

BACKGROUND OF THE INVENTION

The present invention relates to an apparatus for parallel processing image information used in image processing apparatuses such as a copier, facsimile machine and printer.

Image processing apparatuses in which a document image is read by a one-dimensional image sensor and then subjected to necessary processing are now widely applied to various types of apparatuses such as a copier. If such an image processing apparatus is so constructed that all the data of each line of an image is processed by a single processing system, the processing system not only needs to deal with a heavy load but also consumes much time in the processing to disable high-speed image recording or display.

Japanese Patent Application Unexamined Publication No. Sho. 61-133771 discloses a parallel processing apparatus which image information is processed by several processing systems in a divided manner to improve the processing speed. More specifically, with the use of a plurality of microprocessors, image data is divided into n blocks in the scanning direction and the divided digital image signals are processed independently in a parallel manner. There occurs no specific problem in the processing in the case of a digital image signal which allows independent processing of the n block signals divided in the scanning direction. The total processing can be sped up as the number of parallel processable blocks increases.

However, there exist image processing types which do not allow independent processing in each of divided blocks. For example, assume here a case of FIG. 44 in which image information 11 produced by reading a single document is equally divided into first to third blocks $14_1$–$14_3$ in the main scanning direction 12 as indicated by dashed lines 13. In the case of enlarging an image "7" of the leftmost block, i.e., first block $14_1$ by a factor of 4 (in terms of the area), certain image processing needs to be performed so as to produce a result as shown in FIG. 45. That is, while the image "7" belongs only to the first block $14_1$ before the enlarging processing, it bridges both of the first and second blocks $14_1$ and $14_2$ after the processing. Therefore, the processing of this example cannot be performed only by a processing system for the first block $14_1$; that is, a processing system for the second block $14_2$ needs to receive necessary data for its image processing. Therefore, an additional processing system (management processing system) needs to be provided to manage the data exchange between the processing systems, so that the total process becomes difficult to perform.

FIG. 46 shows a case in which a number of images "7" each identical to that of FIG. 44 are generated using what is called a repeat function. For example, the repeat function enables generation of a number of images of the same address. In the example of FIG. 46, the same size images "7" are repeatedly generated in the maximum allowable numbers in the main scanning direction 12 and the sub-scanning direction 16. Therefore, not only the processing system for the first block $14_1$ operates, but the processing systems for the second and third blocks $14_2$ and $14_3$ need to operate while receiving necessary data. As in the case of FIG. 45, an additional management processing system is needed to make the total process complex and difficult to perform.

Problems such as the block data exchange do not occur if the divided processing for the blocks is not performed. However, to increase the processing speed to the same level as the parallel processing case, the frequency of a clock signal needs to be increased to n times the original sampling frequency where n is the number of blocks and a CPU and other parts should be replaced with corresponding parts capable of operating with such a clock signal. In practice, the implementation of such an apparatus is in many cases associated with difficult problems.

SUMMARY OF THE INVENTION

A first object of the present invention is to provide a parallel processing apparatus capable of easily performing image processing of original one line data even in the case of parallel processing in which each scanning line data is divided into a plurality of blocks.

A second object of the invention is to provide a parallel processing apparatus capable of performing image processing without the need of increasing the sampling frequency.

A third object of the invention is to provide a parallel processing apparatus capable of performing quasi-halftone processing while receiving a plurality of line data in a parallel manner.

A fourth object of the invention is to provide a parallel processing apparatus capable of performing image density processing by error spreading while receiving a plurality of line data in a parallel manner.

A fifth object of the invention is to provide a parallel processing apparatus capable of converting the form of image data to that suitable for storage into a page memory after parallel processing of a plurality of line data.

According to a first aspect of the invention, a parallel processing apparatus comprises:

dividing means for dividing first image data of lines constituting one page into a plurality of block data arranged in a main scanning direction;

first parallel processing means for parallel processing the plurality of block data in synchronism with a sync signal common to the plurality of block data; and second parallel processing means for rearranging the plurality of block data processed by the first parallel processing means into second image data grouped every lines of a same number as a number of the block data, and for parallel processing the second image data of the lines of each group with sync signals for the respective lines being sequentially delayed by a predetermined time.

In the parallel processing apparatus according to the first aspect of the invention, since the image data of one page is divided into a plurality of block data and the plurality of block data are processed in a parallel manner, the image processing speed is increased. Since the block data are rearranged into the line-parallel image data, the processing bridging some blocks, such as image reduction/enlargement, can be performed easily. Since after the conversion to the line-parallel processing the sync signals for the respective lines are deviated from each other, the line-parallel image data can easily be converted to line image data.

In the parallel processing apparatus according to the first aspect of the invention, there may be provided a means for absorbing a difference between data processing speeds of the first and second parallel processing means. In this case, circuit devices having not exactly identical data processing speeds can be connected to each other, to facilitate development of products and their modification.

In the parallel processing apparatus according to the first aspect of the invention, there may be provided for each one-block processing cycle a quiescent period during which the image data processing is suspended in the first parallel processing means and the subsequent parts of the apparatus. In this case, the data processing sequence is fixed and the image data processing is simplified in the apparatus in which the line-parallel processing is performed with the data of the respective lines deviated from each other.

According to a second aspect of the invention, a parallel processing apparatus comprises:

dividing means for dividing first image data of lines constituting one page into a plurality of block data arranged in a main scanning direction;

first parallel processing means for parallel processing the plurality of block data in synchronism with a sync signal common to the plurality of block data;

parallel output means for rearranging the plurality of block data processed by the first parallel processing means into second image data grouped every plurality of lines, and for parallel outputting the second image data of the lines of each group while sequentially delaying the second image data of the lines of each group by a predetermined time;

a plurality of matrix tables provided for the respective lines of each group, each of the matrix tables including row elements selected from a two-dimensional matrix containing mapped threshold values necessary for quasi-halftone processing, the selected row elements being separated from each other in a column direction by a number of the lines of each group; and means for performing the quasi-halftone processing on the second image data of the lines of each group using the respective matrix tables.

In the parallel processing apparatus according to the second aspect of the invention, the size of the respective matrix tables can be made the minimum necessary size; and the circuit portion for the halftone processing can be of a relative small scale in spite of the increase of the total processing speed due to the parallel processing.

According to a third aspect of the invention, a parallel processing apparatus comprises:

dividing means for dividing first image data of lines constituting one page into a plurality of block data arranged in a main scanning direction;

first parallel processing-means for parallel processing the plurality block data in synchronism with a sync signal common to the plurality of block data;

parallel output means for rearranging the plurality of block data processed by the first parallel processing means into second image data grouped every plurality of lines, and for parallel outputting the second image data of each group while sequentially delaying the second image data of each group by a predetermined time;

means provided for the respective lines of each group, for performing error spread processing while obtaining density data of a pixel under attention by adding to original density data of the pixel under attention values derived from errors of already processed density data of pixels on a preceding line.

In the parallel processing apparatus according to the third aspect of the invention, to perform the processing for spreading the errors of the density data using the image data of the respective lines sent from the parallel output means, the processing units provided for the respective lines in a parallel manner are connected in a ring-like manner and the density data are processed while the errors of the preceding line are properly reflected. Therefore, high-quality images can be reproduced at high speed. Where the parallel processing is performed in quasi-halftone processing using matrix tables in the similar manner, it is possible to switch between the two types of parallel processing According to a fourth aspect of the invention, a parallel processing apparatus comprises:

dividing means for dividing first image data of lines constituting one page into a plurality of block data arranged in a main scanning direction;

first parallel processing means for parallel processing the plurality of block data in synchronism with a sync signal common to the plurality of block data;

second parallel processing means for rearranging the plurality of block data processed by the first parallel processing means into second image data grouped every lines of a same number as a number of the block data, and for parallel processing the second image data of the lines of each group with sync signals for the respective lines being sequentially delayed by a predetermined time; and parallel output means for rearranging the second image data of the lines of each group processed by the second parallel processing means into third image data in which data of pixels of a same number as the number of the block data are arranged in a parallel manner, and for outputting the third image data one line after another.

In the parallel processing apparatus according to the fourth aspect of the invention, the line-parallel image data processed by the second parallel processing means are converted to the pixel-parallel image data, and then the data of the respective lines are sequentially arranged without decreasing the processing speed so as to become suitable for, for instance, storage into a page memory (ease of address specification). Further, since the number of lines for the parallel processing is equal to the number of pixels for the parallel processing, a video clock signal for the line-parallel processing can be used for the pixel-parallel processing as it is.

BRIEF DESCRIPTION OF THE DRAWINGS

FIGS. 20(a)–20(f) illustrate image data before conversion by a block-line parallel conversion unit of the embodiment;

FIGS. 21(a)–21(d) illustrate image data after the conversion by the block-line parallel conversion unit of the embodiment;

FIG. 23 illustrates designation of an area by enclosing it by a marker in the embodiment;

FIG. 24 illustrates input of an area by use of coordinates in the embodiment;

FIG. 25 illustrates image processing in a mirror editing unit in the embodiment;

DESCRIPTION OF THE PREFERRED EMBODIMENTS

The present invention is hereinafter described in detail by way of embodiments.

Outline of digital copier

Figure 2:
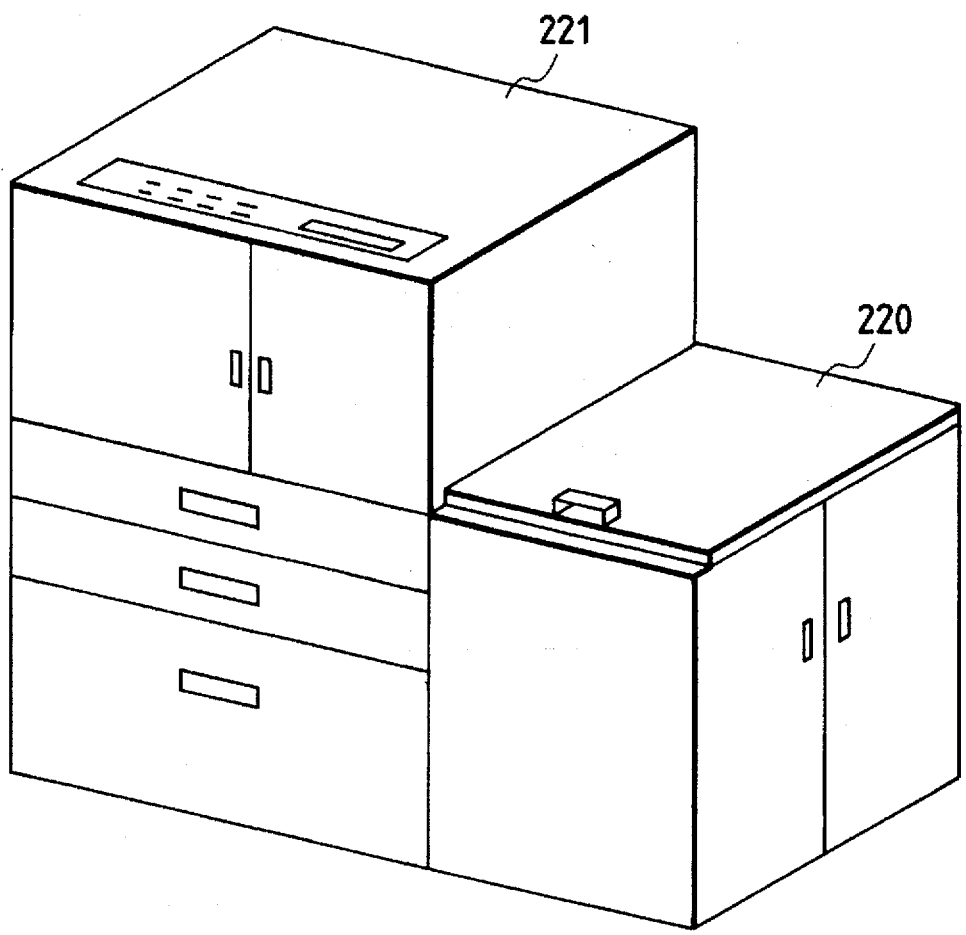
FIG. 2 is a perspective view showing appearance of the digital copier of the embodiment.

FIG. 2 shows appearance of a digital copier using a parallel image processing apparatus according to an embodiment of the invention. This digital copier consists of an image scanner section 220 which reads a document (not shown) with a full-color image sensor and has a page memory for storing image data produced by various image processing and editing operations, and a printing section 221 which performs two-color printing based on the image data stored in the image scanner section 220. The image scanner section 220 has a control panel which allows a user to specify the number of copies, various image processing and editing functions, etc. Copies can be obtained in a desired manner by inputting instructions through the control panel.

Constitution of image scanner section

Figure 3:
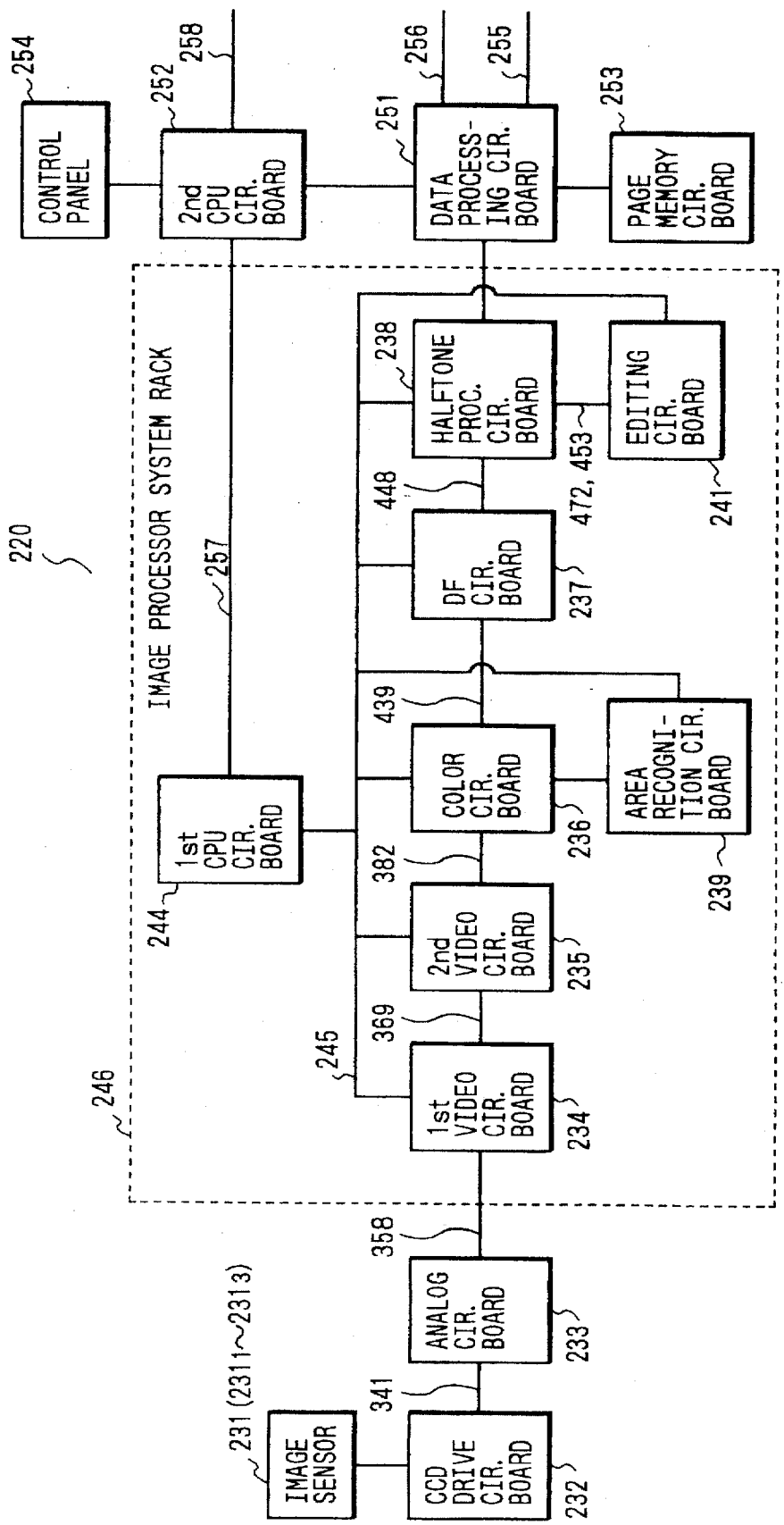
FIG. 3 is a block diagram showing constitution of an image scanner section of the embodiment.

FIG. 3 shows constitution of the image scanner section 220. The image scanner section 220 has an image sensor 231 using a charge coupled device (hereinafter abbreviated as CCD). The image sensor is mounted on a CCD drive circuit board 232. An analog circuit board 233, first video circuit board 234, second video circuit board 235, color circuit board 236, digital filter circuit board (DF circuit board) 237 and halftone processing circuit board 238 are provided downstream of the CCD drive circuit board 232. An area recognition circuit board 239 is connected to the color circuit board 236, and an editing circuit board 241 for image edition is connected to the halftone processing circuit board 238.

The circuit boards from the first video circuit board 234 to the halftone processing circuit board 238, the area recognition circuit board 239, the editing circuit board 241, and a first CPU circuit board 244 for controlling those circuit boards are connected to each other via a VME bus 245, which is a bus according to one of system bus standards. The above circuit boards are accommodated in an image processor system (IPS) rack 246.

A data processing circuit board 251 is provided downstream of the halftone processing circuit board 238 that is located at the end of the image processor system rack 246. A second CPU circuit board 252 and a page memory circuit board 253 on which a page memory is mounted are connected to the data processing circuit board 251. A control panel 254 for operations by an operator (mentioned above) is connected to the second CPU circuit board 252. The data processing circuit board 251 supplied processed image data 255 to the printing section 221 (see FIG. 2), and receives a control signal 256 from it. Further, the second CPU circuit board 252 is connected to the first CPU circuit board 244 via a control data line 257, and to a control unit (described later) of the printing section 221 via a control data line 258.

Figure 4:
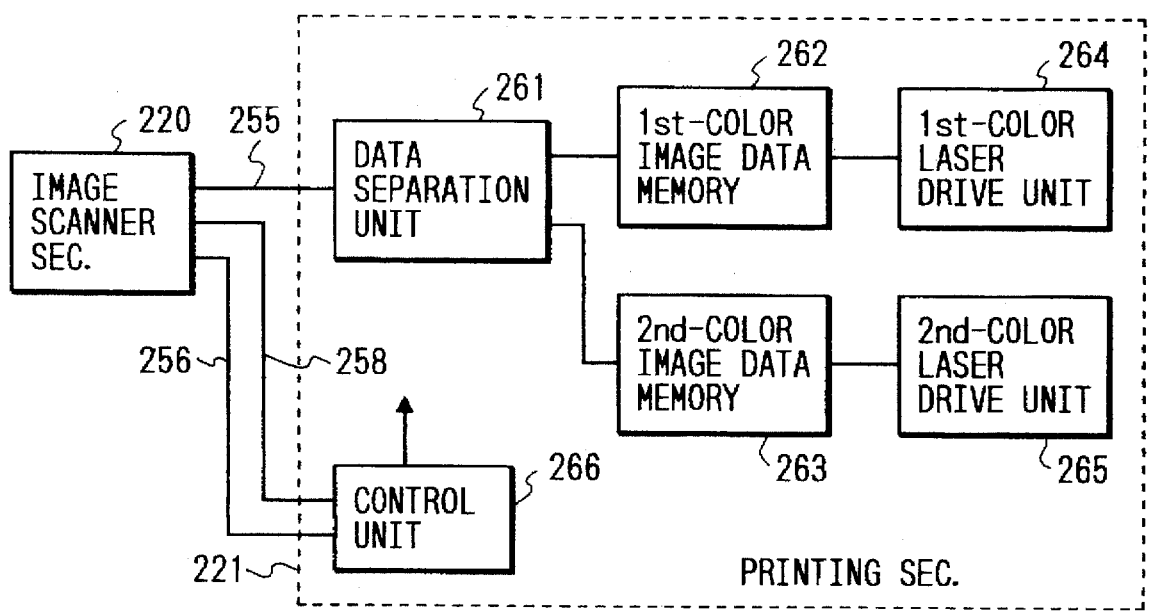
FIG. 4 is a block diagram showing specific constitution of a printing section of the embodiment.

FIG. 4 shows specific construction of the printing section 221. The printing section 221 has a data separation unit 261 which receives the image data 255 from the image scanner section 220. A first-color image data memory 262 and a second-color image data memory 263 for respectively storing first-color and second-color image data are provided downstream of the data separation unit 261. A first-color laser drive unit 264 and a second-color laser drive unit 265 for driving lasers of the respective colors are provided downstream of the first-color image data memory 262 and the second-color image data memory 263, respectively. A control unit 266 is connected to the second CPU circuit board 252 (see FIG. 3) of the image scanner section 220 via the control data line 258, and sends the control signal 256 to the data processing circuit board 251 (see FIG. 3) of the image scanner section 220.

Figure 5:
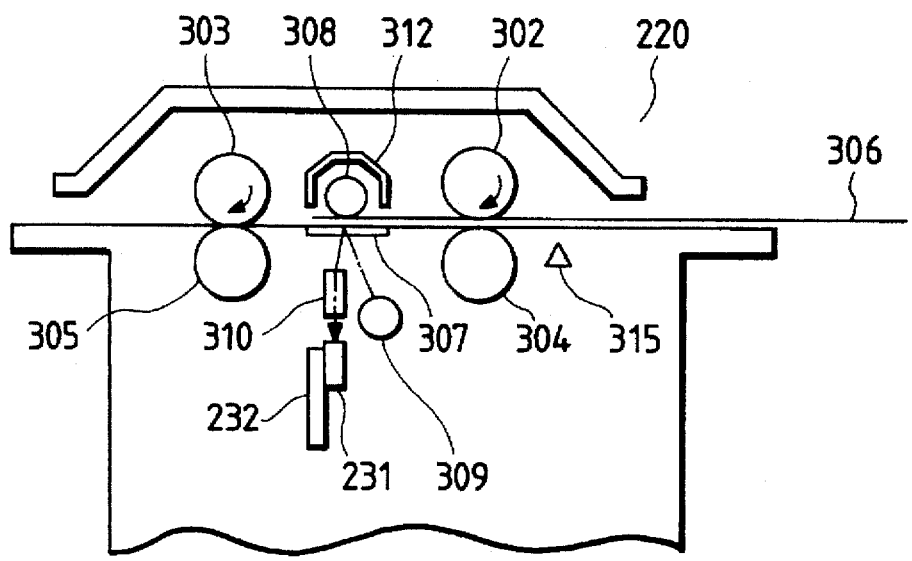
FIG. 5 schematically shows a document reading portion of the image scanner section of FIG. 3.

FIG. 5 shows a general mechanical structure of the image scanner section 220 of FIG. 3. The image scanner section 220 has document feeding rollers 302 and 303 provided above a document feeding path at a predetermined interval, and rollers 304 and 305 provided below the document feeding path at locations corresponding to the rollers 302 and 303, respectively. A document 306 is sandwiched between the rollers 302–306, and thereby conveyed leftward in FIG. 5. A platen glass 307 is provided approximately at the center of the document feeding path, and a platen roller 308 is in contact, from above, with the platen glass 307.

A light source 309 for illuminating the reading positions of the document 306 and a converging rod lens array 310 for focusing reflection light from the document 306 onto the image sensor 231 are disposed below the platen glass 307. The image sensor 231 is mounted on the CCD drive circuit board 232 (see FIG. 3). A sensor 315 for detecting insertion of the document 306 is provided in a document inserting portion of the image scanner section 220. Further, the platen roller 308 is covered with a reference plate 312 having a plurality of flat faces and rotatable about the central axis of the platen roller 308.

Figure 6:
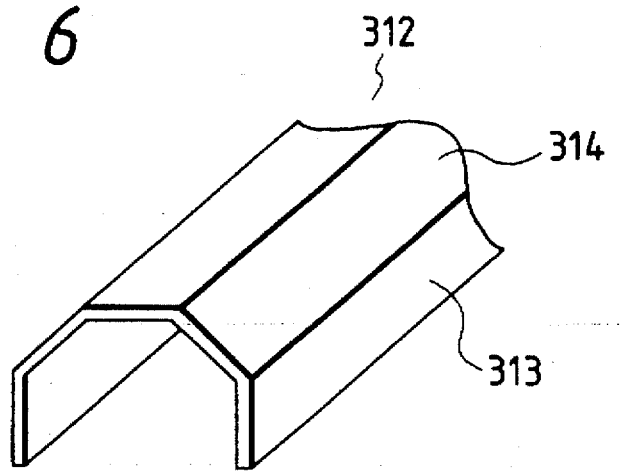
FIG. 6 is a perspective view of part of a reference plate shown in FIG. 5.

FIG. 6 shows a configuration of the reference plate 312, which has a black face 313 and a white face 314 serving as references of the black and white levels, respectively used in the image reading operation. The black face 313 and the white face 314 can selectively be inserted between the platen glass 307 and the platen roller 308.

Figure 7:
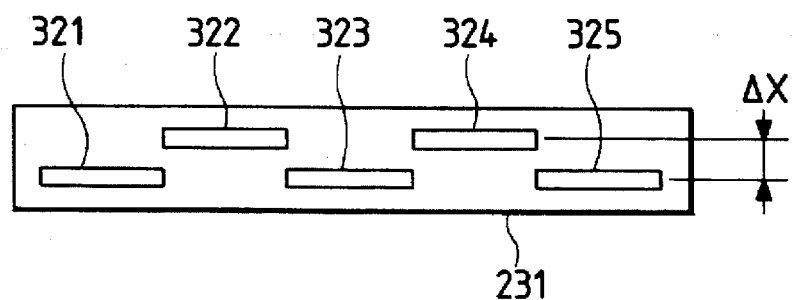
FIG. 7 is a plan view showing an arrangement of image sensor chips used in the embodiment.

FIG. 7 shows an arrangement of sensor ships in the image sensor 231. In this embodiment, the image sensor 231 is of a full-color, contact-type and has first to fifth staggered line sensor chips 321–325.

In this embodiment, the sensor chips 321–325 are arranged so as not to cause intermittence of the image reading in the main scanning direction at their boundaries. The first, third and fifth sensor chips 321, 323 and 325 are spaced, by Δx, from the second and fourth sensor chips 322 and 324 in the direction perpendicular to the main scanning direction. A process of converting the image data as produced by the five line sensor chips 321–325 to image data as would be obtained by reading a single line on the document 306 (see FIG. 5) is performed by a circuit in the first video circuit board 234.

Figure 8:
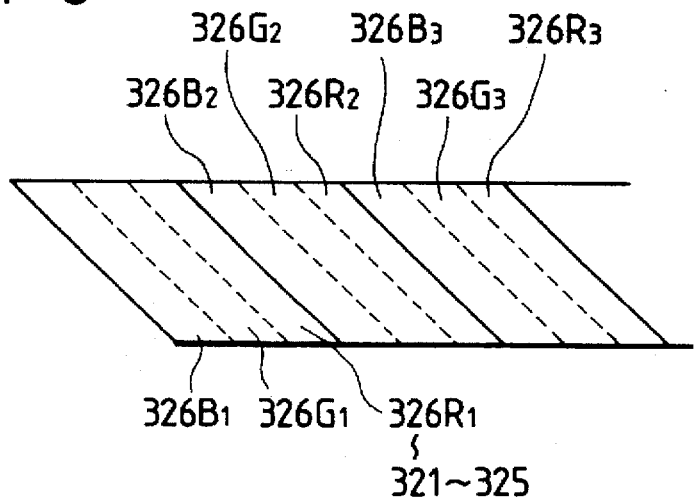
FIG. 8 is a plan view showing a pixel arrangement in the image sensor chip used in the embodiment.

FIG. 8 shows an arrangement of pixels in each chip of the image sensor 231. To realize full-color reading, in each of the first to fifth line sensor chips 321–325 (see FIG. 7), pixels 326B for reading blue image data, pixels 326G for reading green image data and pixels 326R for reading red image data are arranged repetitively in this order.

First CPU circuit board

Figure 9:
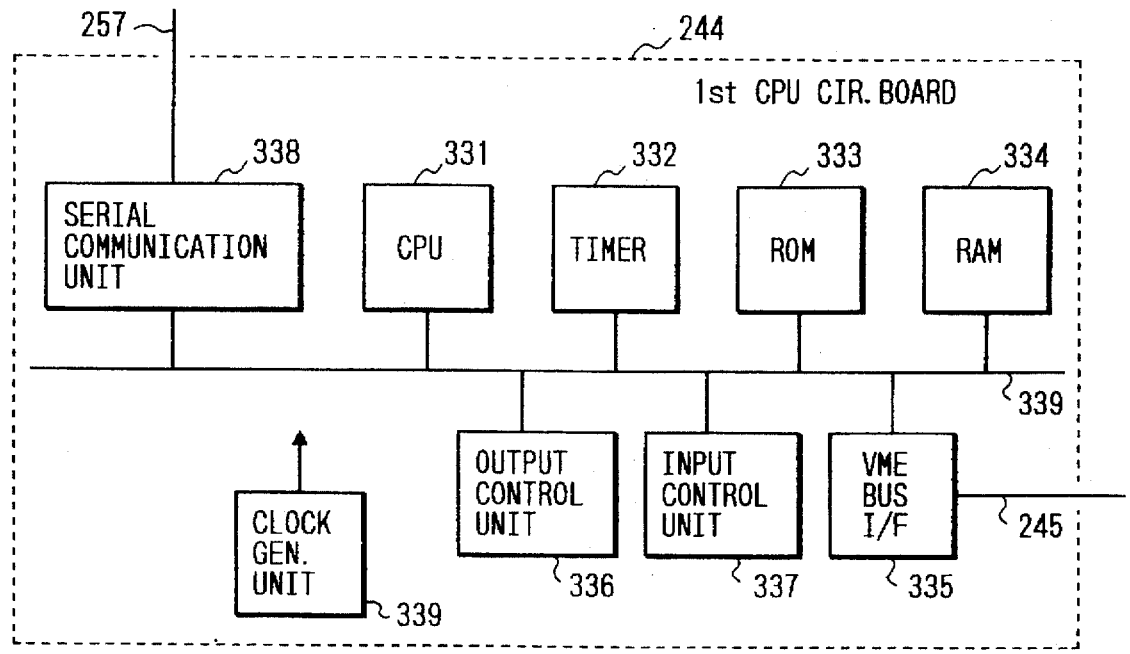
FIG. 9 is a block diagram showing specific constitution of a first CPU circuit board of the embodiment.

FIG. 9 shows specific constitution of the first CPU circuit board 244. The first CPU board 244 has a CPU 331, timer 332, ROM 333, RAM 334, VME bus interface (VME bus I/F) 335, output control unit 336, input control unit 337 and serial communication unit 338, which are connected to each other via a bus 339. The VME bus I/F 335 is connected to the VME bus 245 (see FIG. 3), and the serial communication unit 338 is connected to the control data line 257 (see FIG. 3). The first CPU circuit board 244 controls the respective circuit boards of the image processor rack 246 and communicates with the second CPU circuit board 252 (see FIG. 3) by executing programs stored in the ROM 333 using the RAM 334 as working areas. The first CPU circuit board 244 also includes a clock generation unit 340 for supplying a clock signal to the respective units.

In the image scanner section shown in FIG. 3, when a user specifies the number of necessary copies, various image processing and editing functions, etc. through the control panel 254, a CPU of the second CPU circuit board 252 sends information on the specified image processing and editing functions to the CPU 331 of the first CPU circuit board 244 via the control data line 257. Further, the CPU of the second CPU circuit board 252 sends information on a paper size etc. selected through the control panel 254 to the control unit 266 of the printing section 221 via the control data line 258 (see FIG. 4).

In the first CPU circuit board 244 (see FIG. 9) receives the information on the various image processing and editing functions via the control data line 257, and the CPU 331 interprets that information. The CPU 331 sends various parameters (control data) corresponding to the image processing and editing information to proper registers and RAMs in the respective circuit boards 234–241 of the image processor system rack 246 via the VME bus I/F 335 and the VME bus 245 (see FIG. 3), and sets those parameters in the registers and RAMs.

When the operator inserts the document 306 into the image scanner section 220 (see FIG. 5), the sensor 315 is turned on, which is detected by the CPU 331 via the input control unit 337 of the first CPU circuit board 244 (FIG. 9). Then, the CPU 331 drives a document feeding motor (not shown), so that the document 306 is conveyed by the document feeding rollers 302 and 303. When the document reaches the platen roller 308, the document 306 is illuminated with the light emitted from the light source 309, and the reflection light impinges on the image sensor 231. In this state, the document 306 is read with the image sensor 231 being driven by the CCD drive circuit board 232 (see FIG. 3), and a CCD video signal 341 is sequentially processed by the analog circuit board 233.

Analog circuit board

Figure 10:
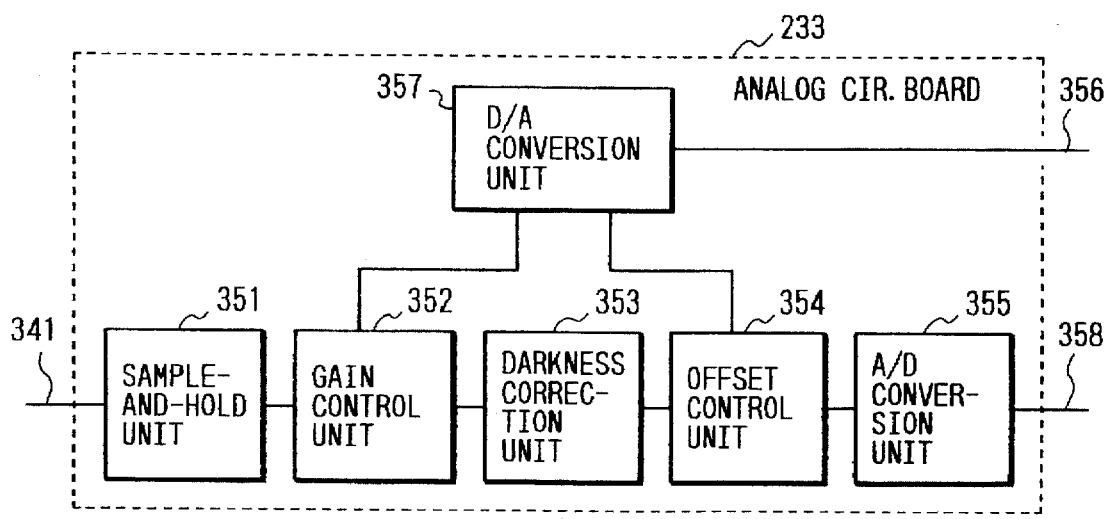
FIG. 10 is a block diagram showing specific constitution of an analog circuit board of the embodiment.

FIG. 10 shows specific constitution of the analog circuit board 233 of FIG. 3. A sample-and-hold unit 351 receives the CCD video signal 341 from the CCD drive circuit board 232 (see FIG. 3), and extracts the effective image signal from it. A gain control unit 352, darkness correction unit 353, offset control unit 354 and A/D conversion unit 355 are provided downstream of the sample-and-hold unit 351. A D/A conversion unit 357 D/A-converts data 356 sent from the first video circuit board 234 (see FIG. 3), and sets the gain control unit 352 and the offset control unit 354 based on the converted data. Image data 358 output from the A/D conversion unit 355 is input to the image processor system rack 246 (see FIG. 3).

In this digital copier, prior to the reading of the document 306 and when the image scanner section 220 (see FIG. 5) is in a power-on state, the black face 313 of the reference plate 312 (see FIG. 6) is placed on the platen glass 307 and read by the image sensor 231. The D/A conversion unit 357 is controlled by the CPU 331 so as to automatically set an offset of the offset control unit 354 (see FIG. 10) so that a reading value of the black face 313 takes a predetermined value (automatic offset control (AOC)).

Then, the white face 314 of the reference plate 312 (see FIG. 6) is placed on the platen glass, and read by the image sensor 231. The D/A conversion unit 357 is controlled by the CPU 331 so as to automatically set a gain of the gain control unit 352 so that a reading value of the white face 313 takes a predetermined value (automatic gain control (AGC)).

With the above pre-adjustments, the actual reading data of the document 306 becomes video data which does not saturate and has a sufficiently wide dynamic range, digitized by the A/D conversion unit 355, and then sent to the first video circuit board 234 (see FIG. 3) as the image data 358. The darkness correction unit 353 removes an output variation component of the image sensor 231 as would otherwise be caused by a dark current, using an output signal of shield bits (shield pixels).

First video circuit board

Figure 11:
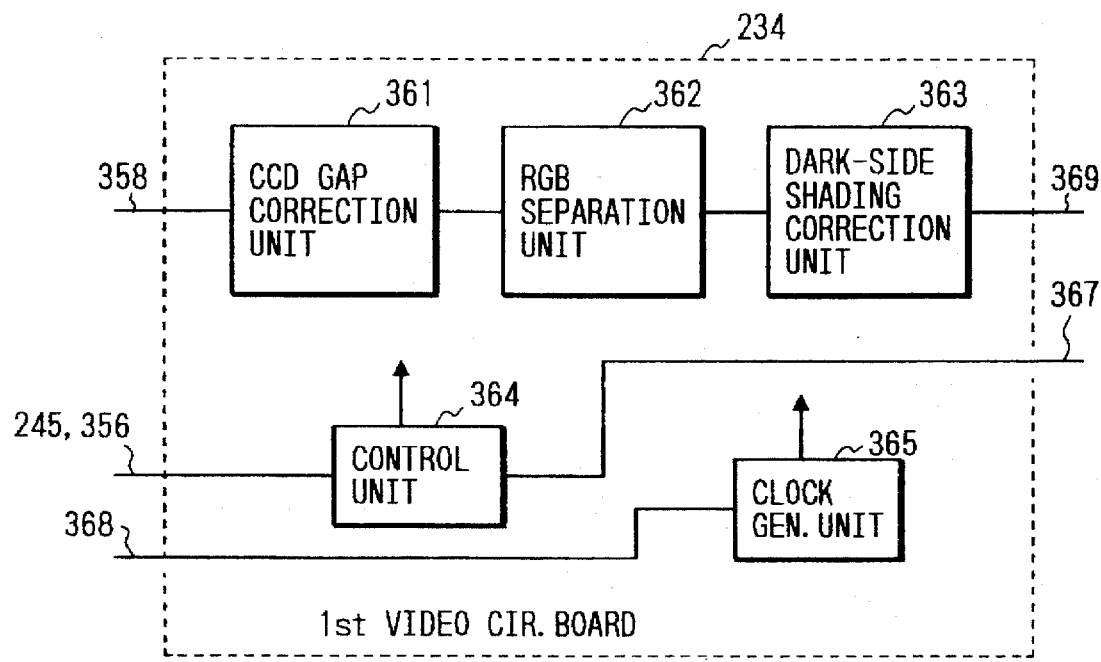
FIG. 11 is a block diagram showing specific constitution of a first video circuit board of the embodiment.

FIG. 11 shows specific constitution of the first video circuit board 234 of FIG. 3. The first video circuit board 234 has a CCD gap correction unit 361 which receives the image data 358 from the analog circuit board 233 (see FIG. 3) and performs a correction in connection with the gap between the first to fifth line sensor chips 321–325. A RGB separation unit 362 and a dark-side shading correction unit 363 are provided in this order downstream of the CCD gap correction unit 361. The first video circuit board 234 further has a control unit 364 for controlling the above units 361–363, and a clock generation circuit 365 for supplying a clock signal to those units.

Via the VME bus 245, the control unit 364 sends the data 356 to the analog circuit board 233 (see FIG. 10), and a control signal 367 to the second video circuit board 235 (see FIG. 3). The clock generation circuit 365 supplies the analog circuit board 233 with a drive clock signal 368, which is sent to the CCD drive circuit board 232 (see FIG. 3) via the analog circuit board 233.

As described above, in this embodiment the image sensor 231 consists of five sensor chips 321–325 that are staggered as shown in FIG. 7, in which two chip groups are spaced from each other by the gap $\Delta x$. The CCD gap correction unit 361 converts the data as produced by the five sensor chips 321–325 to data as would be obtained by reading a single line on the document 306. Specifically, the CCD gap correction unit 361 delays the data produced by the second and fourth sensor chips 322 and 324 by use of memories to obtain the data corresponding to a single line.

Figure 12:
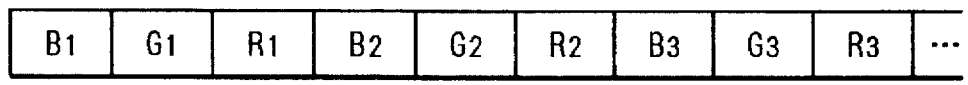
FIG. 12 illustrates an image data sequence output from a CCD gap correction unit of the embodiment.

FIG. 12 shows an image data sequence that is output from the CCD gap correction unit 361. If the image data that are output from the pixels 326B, 326G and 326R are written as $B_1, G_2, R_1, B_2, G_2, R_2, \ldots, B_N, G_N, R_N$, respectively, they are repeated in the order of B (blue), G (green) and R (red) as shown in FIG. 12.

Figure 13A:
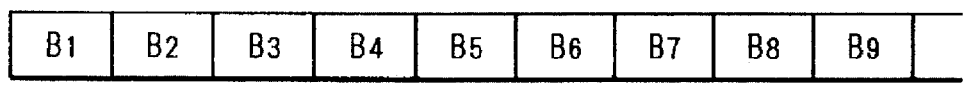
FIGS. 13(a)–13(c) illustrate outputs of a RGB separation unit of the embodiment.
Figure 13B:
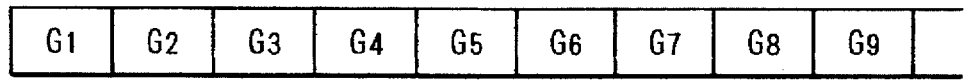
Figure 13C:
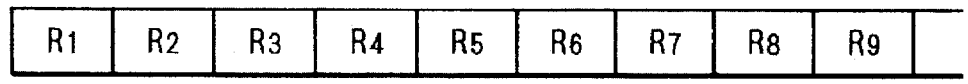

On the other hand, FIGS. 13(a)–13(c) show outputs of the RGB separation unit 362. FIGS. 13(a)–13(c) respectively show a blue image data sequence, a green image data sequence and a red image data sequence. In this manner, the RGB separation circuit 362 converts the serial image data of B, G and R (see FIG. 12) to the respective image data sequences of B, G and R.

The image data thus-separated for B, G and R are sent to the dark-side shading correction unit 363 (see FIG. 11), where they are subjected to dark-side shading correction as described below. That is, prior to the reading of the document 306 and after the automatic offset control and automatic gain control operations performed when the image scanner section 220 (see FIG. 5) is in a power-on state, the image data produced by reading the black face 313 is stored in a built-in memory on a pixel-by-pixel basis, and is subtracted from the image data of the respective pixels produced by reading the actual document 306. Image data 369 sequentially obtained by the above process of the first video circuit board 234 is sent to the second video circuit board 235.

Second video circuit board

Figure 14:
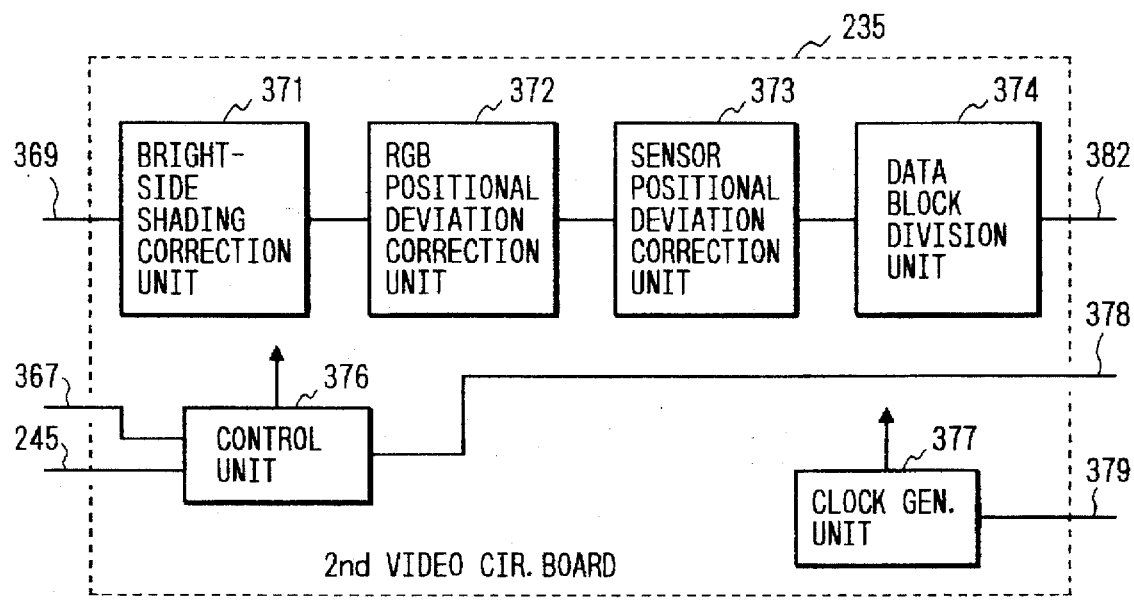
FIG. 14 is a block diagram showing specific constitution of a second video circuit board of the embodiment.

FIG. 14 shows specific constitution of the second video circuit board 235. The second video circuit board 235 has a bright-side shading correction unit 371 which receives the image data 369 from the first video circuit board 234 (see FIG. 3). There are provided, in the following order, downstream of the bright-side shading correction unit 371 a RGB positional deviation correction unit 372, a sensor positional deviation correction unit 373, a data block division unit 374, a control unit 376 for controlling the above units 371–374, and a clock generation unit 377 for supplying a clock signal to those units 371–374. The control unit 376 is connected to the VME bus 245. Further, the control unit 376 receives the control signal 367 from the first video circuit board 234 (FIG. 3), and supplies a control signal 378 to the color circuit board 236. The clock generation unit 377 supplies a control clock signal 379 to the respective circuit boards downstream thereof.

The image data 369 input to the second video circuit board 235 is first subjected to the bright-side shading correction in the bright-side shading correction unit 371. The bright-side shading correction is performed in a manner similar to the case of the dark-side shading correction. That is, after the automatic offset control and automatic gain control operations, the image data produced by reading the white face 314 is stored in a memory on a pixel-by-pixel basis, and the image data produced by reading the actual document 306 is divided (i.e., normalized) on a pixel-by-pixel basis by the image data stored in the memory.

After being subjected to the dark-side and bright-side shading corrections, the image data is free from the influence of the brightness distribution of the light source 309 (see FIG. 5) and the sensitivity variation of the respective pixels of the image sensor 231. The CPU 331 (see FIG. 9) can control the automatic offset control, automatic gain control and dark-side and bright-side shading corrections, because it can set the offset of the automatic offset control and the gain of the automatic gain control, and can write to and read from the respective memories of the dark-side shading correction unit 363 and the bright-side shading correction unit 371 via the VME bus 245.

In the image sensor 231 (see FIG. 3) used in this embodiment, since the pixels 326B, 326G and 326R are arranged in this order in the main scanning direction as shown in FIG. 8, the actual document reading positions of B, G and R are deviated from each other, which would cause an erroneous judgment when the color is judged in the color circuit board 236 provided in the next stage. Therefore, a process of correcting the reading positions of B, G and R to a single imaginary position is required. This correction is performed by the RGB positional deviation correction unit 372 in the following manner. For example, if the position of the pixel $326G_2$ is employed as a reference, imaginary B data and imaginary R data at that position are calculated from image data of the pixels $326B_2$ and $326B_3$ and image data of the pixels $326R_1$ and $326R_2$, respectively.

While the above description of the operation is made as if there existed only one image sensor 231, actually there are provided three image sensors $231_1$, $231_2$ and $231_3$ to enable reading of wide documents. Although the three image sensors $231_1$, $231_2$ and $231_3$ are mounted with an adjustment to enable reading of the same line (i.e., the same position in the sub-scanning direction) on the document 306, actually they deviate from each other to some extent in the sub-scanning direction. This deviation is corrected by the sensor positional deviation correction unit 373 based on a technique similar to the case of the CCD gap correction. That is, the image data of the respective sensors $231_1$, $231_2$ and $231_3$ are delayed using memories so as to be properly connected to each other in the main scanning direction.

While high-speed digital copiers capable of reading wide documents are required to process the image data at high speed, there exist certain limits of the operation speed of RAMs, digital ICs, etc. Considering this fact, in this embodiment the output image data of the sensor positional deviation correction unit 373 is divided into a plurality of blocks in the main scanning direction by the data block division unit 374.

Figure 15:
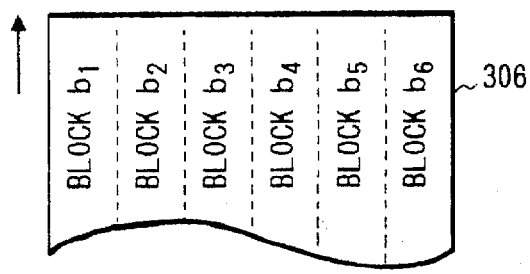
FIG. 15 illustrates division of output image data in the main scanning direction in the embodiment.

FIG. 15 illustrates how the output image data is divided in the main scanning direction. For example, as shown in FIG. 15, the output image data of one image sensor 231 is divided into two blocks; that is, the reading data of the document 306 is divided into a total of six blocks $b_1$–$b_6$. In the subsequent stage, the blocks $b_1$–$b_6$ are processed in a parallel manner. Image data 382 as divided into the six blocks $b_1$–$b_6$ is sent to the color circuit board 236.

Color circuit board

Figure 16:
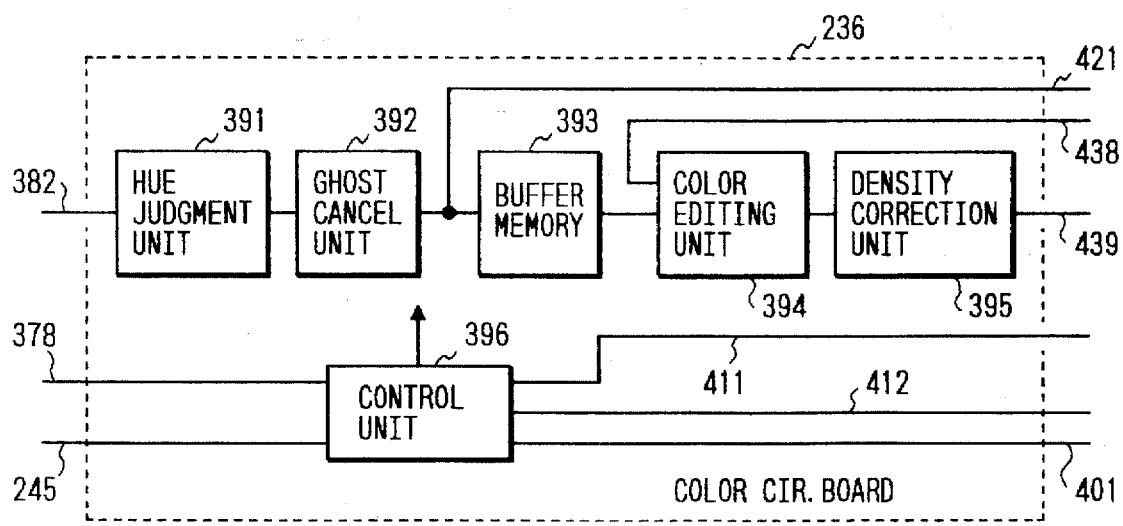
FIG. 16 is a block diagram showing specific constitution of a color circuit board of the embodiment.

FIG. 16 shows specific constitution of the color circuit board 236. The color circuit board 236 has a hue judgment unit 391 for receiving the image data 382 from the second video circuit board 235 (see FIG. 3). A ghost cancel unit 392, buffer memory 393, color editing unit 394 and density correction unit 395 are provided in this order downstream of the hue judgment unit 391. A control unit 396 controls the above respective units 391–395. The control unit 396 is connected to the VME bus 245. Further, the control unit 396 receives the control signal 378 from the second video circuit board 235 (see FIG. 14) and a control signal 401 from the area recognition circuit board 239 (see FIG. 3), and supplies control signals 411 and 412 to the digital filter circuit board 237 (see FIG. 3) and the area recognition circuit board 239, respectively.

The image data 382 is input to the color circuit board 236 in the form of color image signals of R, G and B. The hue judgment unit 391 judges the color of an image on the document 306, and generates a color code signal (coded signal) and density data. The subsequent ghost cancel unit 392 corrects the color code signal generated by the hue judgment unit 391. It may be the case that as a result of the RGE positional deviation correction in the second video circuit board 235 (see FIG. 3), an erroneous color judgment occurs, for instance, at an edge of a black image on the document 306 to cause generation of a color code not representing an achromatic color. The ghost cancel unit 392 corrects such a color code (i.e., a ghost) generated as a result of erroneous color judgment to one representing an achromatic color. Variation patterns of color codes in the occurrence of ghosts are known, and when one of those variation patterns is met a color code is corrected to one representing an achromatic color.

The density data and a color code signal 421, which have been generated in the above manner, are sequentially stored into the buffer memory 393. The color code signal 421 output from the ghost cancel unit 392 is also sent to the area recognition circuit board 239 (see FIG. 3). In this embodiment, various editing operations can be performed on a real-time basis on an area enclosed by a marker written on the document 306 with a marker pen. The area recognition circuit board 239 detects the area enclosed by the marker.

A description of the area recognition circuit board 239 is inserted below, and the remaining description of the color circuit board 236 follows it.

Area recognition circuit board

Figure 17:
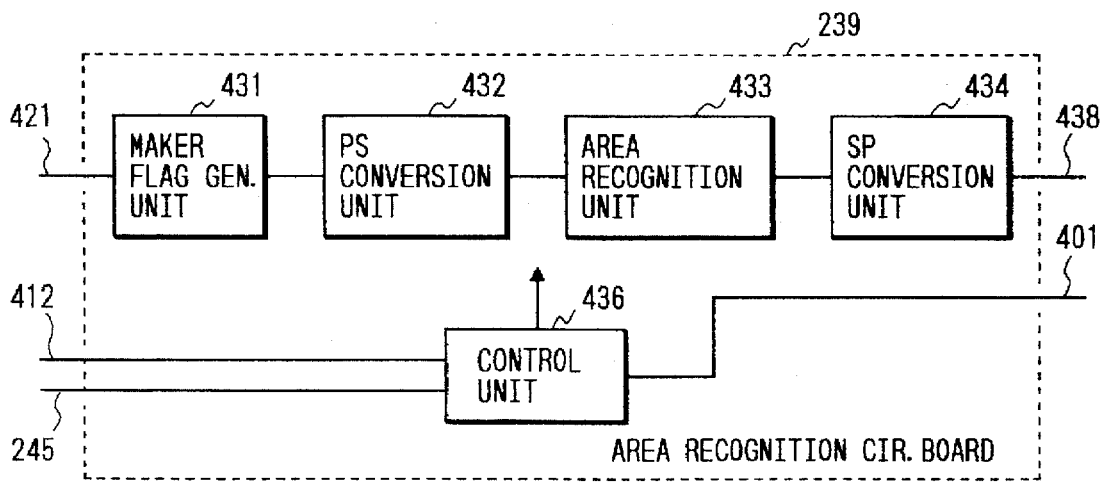
FIG. 17 is a block diagram showing specific constitution of an area recognition circuit board of the embodiment.

FIG. 17 shows specific constitution of the area recognition circuit board 239. The area recognition circuit board 239 has a marker flag generation unit 431 for receiving the color code signal 421 from the color circuit board 236 (see FIG. 16). A parallel-serial conversion (hereinafter abbreviated as PS conversion) unit 432, an area recognition unit 433 and a serial-parallel conversion (hereinafter abbreviated as SP conversion) unit 434 are provided in this order downstream of the marker flag generation unit 431. A control unit 436 control the above respective units 431–434. The control unit 436 is connected to the VME bus 245. Further, the control unit 436 receives the control signal 412 from the color circuit board 236, and supplies the control signal 401 to the color circuit board 236.

The color code signal 421 sequentially sent from the color circuit board 236 is divided for the respective blocks. The marker flag generation unit 431 judges from the color code whether it has received a marker image. If the judgment is affirmative, the marker flag generation unit 431 generates a marker flag. Then, the PS conversion unit 432 converts the block-divided marker flag to a one-line signal. The area recognition unit 433 recognizes an area enclosed by a marker based on the one-line marker flag thus obtained, and generates an area signal indicating the area. The area signal is again divided into respective blocks by the SP conversion unit 434, and sequentially supplied, as an area signal 438, to the color editing unit 394 of the color circuit board 236 (see FIG. 16).

It takes a certain period for the area recognition circuit board 236 to recognize the area. The buffer memory 393 is provided in the color circuit board 236 to store the color code signal and the density data during this period, to take synchronization with the area signal 438 as output from the area recognition circuit board 236.

In this manner, the block-divided area signal 438 output from the area recognition circuit board 239 is input to the color editing unit 394. The control signal 401 output from the control unit 436 (see FIG. 17) is input to the control unit 396. In synchronism with the area signal 438, the control unit 396 allows the density data and the color code signal of a corresponding pixel to be read from the buffer memory 394 and input to the color editing unit 394.

The digital copier of this embodiment is a two-color copier, and can designate, by a sub-color flag, which of the two colors should be used to print a certain color on the document 306. Further, it is possible, for instance, to designate, by a drop-color flag, an image of a certain color on the document 306 as an image to be deleted. With these functions, for example, image data obtained by reading a marker itself is deleted tacitly, because it need not be reproduced. The function related to the two-color designation or the drop color may be effected only for an area specified by a marker or an area outside that area. Further, a BKG enable flag for on/off control of the surface color removal may be generated to designate whether the surface color removal in the next stage should be effected or not for an area inside or outside the specified area. These flags are generated by the color editing unit 394.

The thus-generated flags, the density data and the color code signal are sequentially forwarded to the density correction unit 395. The density correction unit 395 serves to change density data of a pixel that is associated with a drop color flag to white data (or delete it), and to perform independent density adjustment for each color (for each color code) on the document 306. Outputs 439 processed in the above manner including the sub-color flag, BKG enable flag, area signal, density data, etc. are sequentially sent to the digital filter circuit board 237 (see FIG. 3)

Digital filter circuit board

Figure 18:
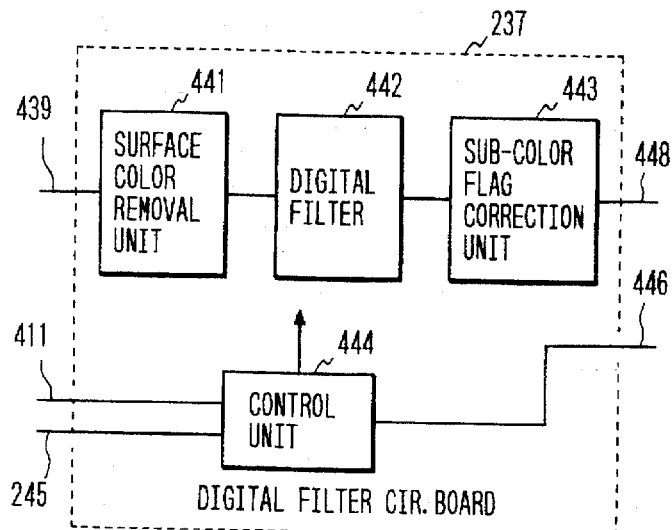
FIG. 18 is a block diagram showing specific constitution of a digital filter circuit board of the embodiment.

FIG. 18 shows specific constitution of the digital filter circuit board 237. The digital filter circuit board 237 has a surface color removal unit 441 for receiving the outputs 439 of the color circuit board 236 (see FIG. 16). A digital filter 442 and a sub-color flag correction unit 443 are provided in this order downstream of the surface color removal unit 441. A control unit 444 controls the above respective units 441–443, and is connected to the VME bus 245. The control unit 444 receives the control signal 411 from the color circuit board 236, and sends a control signal 446 to the halftone processing circuit board 238 (see FIG. 3).

In the digital filter circuit board 237, the surface color removal unit 441 sequentially changes image data of a surface portion in an area associated with a BKG enable flag to white data, and generates a BKG flag. The digital filter 442 performs edge emphasis and smoothing in accordance with the selected image mode. When the surface density is raised at an image edge portion by the smoothing operation, the sub-color flag correction unit 443 performs a correction of equalizing the sub-color flag of the surface-density-raised pixel to that of an image portion, to prevent, for instance, the occurrence of a black outline around a color character on the document 306. Outputs 448 processed in the above manner including the sub-color flag, density data, area flag, BKG flag. etc. are sequentially sent to the halftone processing circuit board 238 (see FIG. 3).

Halftone processing circuit board

Figure 19:
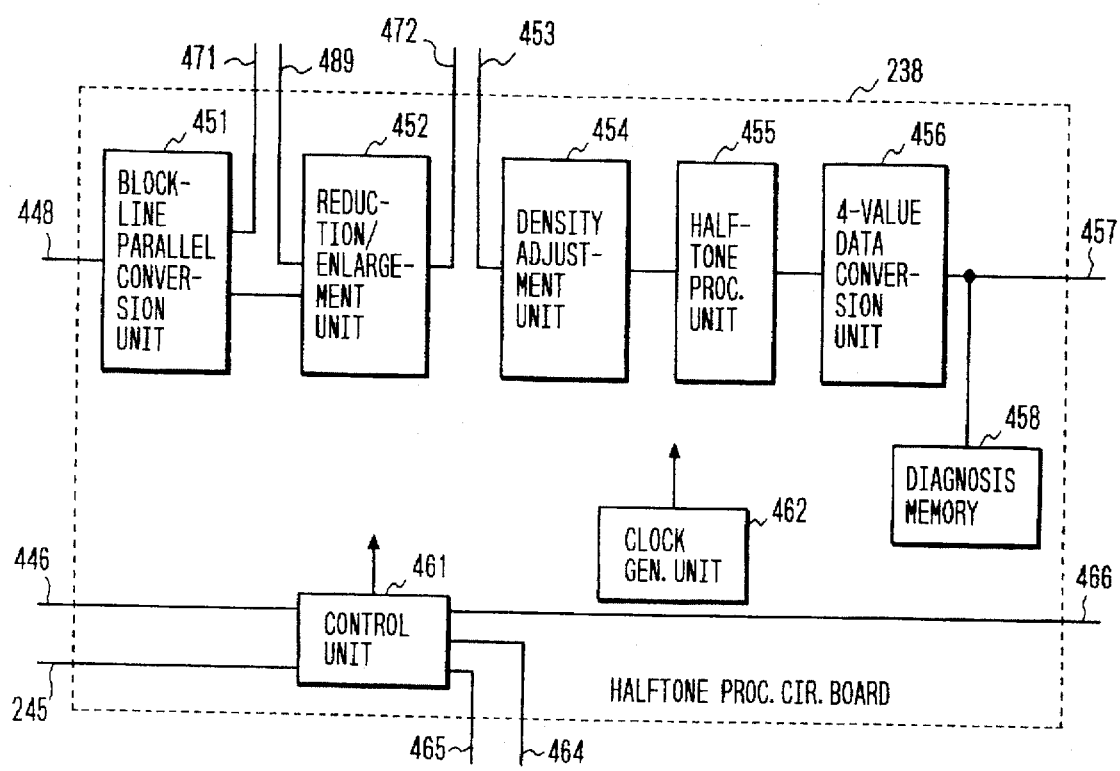
FIG. 19 is a block diagram showing specific constitution of a halftone processing circuit board of the embodiment.

FIG. 19 shows specific constitution of the halftone processing circuit board 238. In the halftone processing circuit board 238, a block-line parallel conversion unit 451 receives the outputs 448 of the digital filter circuit board 237 (see FIG. 18). A reduction/enlargement unit 452, a density adjustment unit 454 for receiving image data 453 from the editing circuit board 241 (see FIG. 3), a halftone processing unit 455 and a four-value data conversion unit 456 are provided in this order downstream of the block-line parallel conversion unit 451. A diagnosis memory 458 is connected to the four-value data conversion unit 456, and stores output data 457 thereof. A control unit 461 controls the above respective units 451, 452, 454–456 and 458. A clock generation unit 462 supplies a clock signal to those units. The control unit 461 is connected to the VME bus 245. The control unit 461 receives the control signal 446 and 464 from the digital filter circuit 237 and the editing circuit board 241, respectively, and forwards control signals 465 and 466 to the editing circuit board 241 and the data processing circuit board 251 (see FIG. 3), respectively.

In the digital copier of this embodiment, while the image reduction/enlargement in the sub-scanning direction is performed by changing the document feeding speed as in the case of analog copiers, the reduction/enlargement in the main scanning direction is performed by digital image processing. The digital image processing is very complex if it is performed in a parallel manner for the respective blocks. To solve this problem, the block-line parallel conversion unit 451 of the halftone processing circuit board 238 converts the image data sequences of the six (in total) respective blocks to image data sequences enabling line-by-line parallel processing.

FIGS. 20(a)–20(f) show a structure of the image data before the conversion by the block-line parallel conversion unit 451. As shown in these figures, before the conversion, each of the first to sixth blocks $b_1$–$b_6$ has an image data sequence arranged in the order of first line data $L_1$, second line data $L_2$, . . . .

On the other hand, FIGS. 21(a)–21(d) show a structure of the image data after the conversion by the block-line parallel conversion unit 451. As shown in these figures, the above image data is converted to parallel image data sequences of four lines, that is, rearranged as follows. For example, as shown in FIG. 21(a), the data of the first to sixth blocks $b_1$–$b_6$ of the first line $L_1$ are sequentially arranged, and there follow the data of the fifth line $L_5$, ninth line $L_9$, and so forth. As shown in FIG. 21(b), the data of the second line $L_2$, sixth line $L_6$, tenth line $L_{10}$, and so forth are arranged in this order. The image data rearrangement is similarly performed for the remaining data as shown in FIGS. 21(c) and 21(d).

While the image data subjected to the conversion of the block-line parallel conversion unit 451 (see FIG. 19), the BKG flag and the sub-color flag are supplied to the reduction/enlargement unit 452, an area flag (area signal) 471 is sent to the editing circuit board 241 (see FIG. 3). Image data output from the reduction/enlargement unit 472 is also sent to the editing circuit board 241.

The remaining description of the halftone processing circuit board 238 will be made after the editing circuit board 241 is described below.

Editing circuit board

Figures 22, 26:
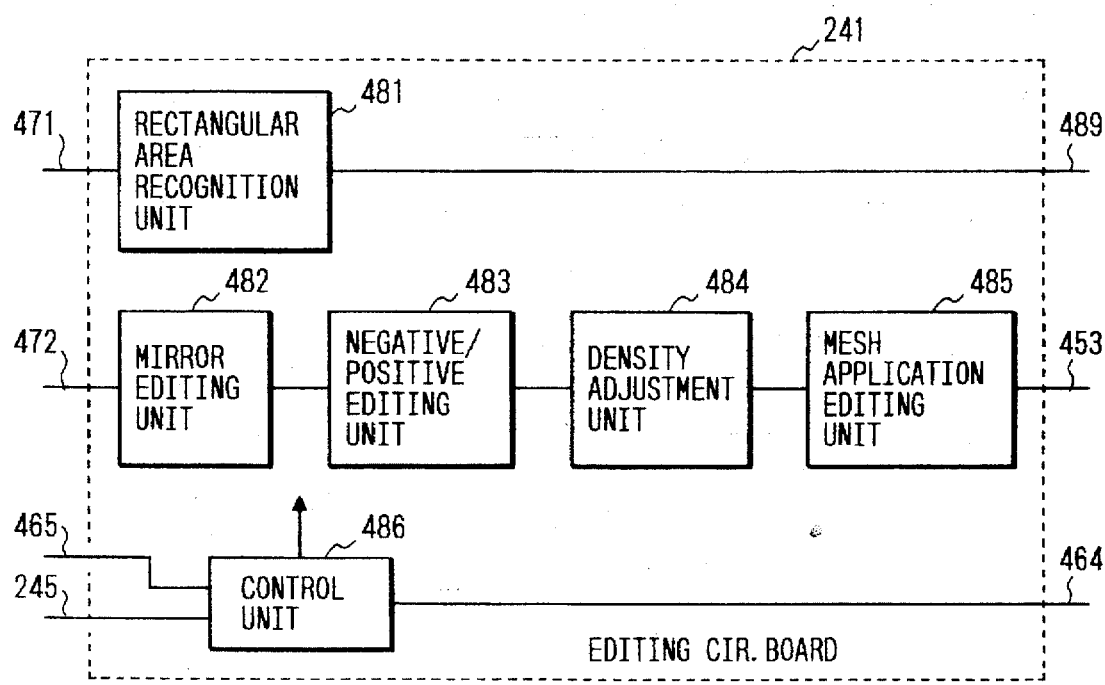
FIG. 22 is a block diagram showing specific constitution of an editing circuit board of the embodiment.
FIG. 26 shows how the image data of respective lines are divided in the embodiment.

FIG. 22 shows specific constitution of the editing circuit board 241. The editing circuit board 241 has a rectangular area recognition unit 481 for receiving the area flag (area signal) 471 from the halftone processing circuit board 238 (see FIG. 19) and a mirror editing unit 482 for receiving the image data 472 from the halftone processing unit 238. A negative/positive editing unit 483, a density adjustment unit 484 and a mesh application editing unit 485 are provided in this order downstream of the mirror editing unit 482. A control unit 486 controls the above respective units 481–485. The mesh application editing unit 485 supplies image data 453 to the density adjustment unit 454 of FIG. 19. The control unit 486 is connected to the VME bus 245. The control unit receives the control signal 465 from the halftone processing circuit board 238, and sends the control signal 464 to the halftone processing circuit board 238.

The rectangular area recognition unit 481 supplies an area flag (area signal) to the reduction/enlargement unit 452 of FIG. 19. In connection with the area flag 489, a description is made below of an area designation method. The digital copier of this embodiment can designate an area by two methods.

FIG. 23 illustrates the first area designation method in which an area is designated by enclosing it by a marker. When a rectangle is drawn on the document 306 with a marker pen, four corner points $491_1$–$491_4$ are detected, based on which the rectangle is recognized. For example, various editing operations are performed on the area inside the rectangle.

FIG. 24 illustrates the second area designation method in which an area is input in the form of coordinates. According to this method, distances $x_A$ and $x_B$ of points A and B on the document 306 as measured from the document left end and distances $y_A$ and $y_B$ of those points as measured from the document top end are input through the control panel 254 (see FIG. 3). Based on these coordinates, a rectangular area having the above two points as diagonal points is recognized. Various editing operations are performed on the recognized rectangular area.

The rectangular area recognition unit 481 recognizes a rectangular area and generates area flags (area signal) for respective pixels within the rectangular area. The area flags (area signal) 489 sequentially processed by the rectangular area recognition unit 481 are sent to the reduction/enlargement unit 452 of the halftone processing circuit board 238 (see FIG. 19). In the reduction/enlargement processing unit 452, the area flag 489, together with the BKG flag, sub-color flag and density data, are subjected to the reduction/enlargement operation. The image data 472 as subjected to the reduction/enlargement operation is sequentially sent to the mirror editing unit 482 of the editing circuit board 241 (see FIG. 22), which perform editing operations on the image data 472 on a realtime basis.

FIG. 25 illustrates an example of image processing performed in the mirror editing unit 482. The mirror editing unit 482 performs a mirror editing operation on a rectangular area 501 shown in part (a) of FIG. 25 (or on the entire image area) to produce a mirror image shown in part (b) of FIG. 25.

The negative/positive editing unit 483 of FIG. 22 next to the mirror editing unit 482 produces a negative/positive (i.e., white/black) inverted image. The density adjustment unit 484 next to the negative/positive editing unit 483 corresponds to a copy density adjustment function on the control panel 254 (see FIG. 3), and can select among several density conversion curves for each of the two output colors. The mesh application editing unit 485 performs mesh application in accordance with a mesh pattern selected through the control panel 254. The mesh application editing unit 485 also performs image deletion within an area (masking) and image deletion outside an area (trimming). Needless to say, the negative/positive editing and the mesh application editing can be effected for either of an area enclosed by a marker and the entire image. The image data 453 subjected to the above successive operations is sent to the halftone processing circuit board 238 shown in FIG. 19.

Returning to the description of the halftone processing circuit board 238 of FIG. 19, the image data 453 as output from the editing circuit board 241 is input to the density adjustment unit 454. The density adjustment unit 454 has functions equivalent to the density adjustment unit 484 of the editing circuit board 241 (see FIG. 22). The editing circuit board 241 is an optional circuit board. If it is not included in the copier, the density adjustment is performed by the density adjustment unit 454 of the halftone processing circuit board 238. On the other hand, if it is included in the copier, the density adjustment unit 454 performs no actual operation. That is, if the editing circuit board 241 is included in the digital copier of this embodiment, it is possible to select the density of an mesh application pattern through the control panel 254 by use of the editing circuit board 241. To avoid the case that the density thus selected is varied by the copy density adjustment through the control panel 254, the copier is so constructed that the density adjustment is performed before the mesh application editing operation. Therefore, where the editing circuit board 241 is included, the density adjustment is performed by the density adjustment unit 484 of the editing circuit board 241.

In the halftone processing unit 455 shown in FIG. 19, multivalue image data is converted to four-value data according to the area gradation scheme. That is, the density of one pixel is converted to one of four gradation levels of white, first gray, second gray that is darker than the first gray, and black. The thus-processed data (four-value density data and sub-color flags) of a plurality of pixels are combined by the four-value data conversion unit 456 to become the output data 457, which is sequentially supplied to the data processing circuit board 251 that is located outside the image processor system rack 246 (see FIG. 3). For self-diagnosis, the diagnosis memory 458 stores the output data 457 of the four-value data conversion unit 456.

The data processing circuit board 251 of FIG. 3 forwards the image data sent from the halftone processing circuit board 238 to the page memory circuit board, where the image data is stored in a page memory. When the entire document 306 has been read in the above manner, the CPU 331 of the first CPU circuit board 244 (see FIG. 9) supplies information to the CPU of the second CPU circuit board 252 (see FIG. 3) via the control data line 257. In response, via the control data line 258, the CPU of the second CPU circuit board 252 sends to the control unit 266 of the printing section 221 (see FIG. 4) a sheet-feeding instruction and information indicating that the image data is stored in the image memory.

The control unit 266 of the printing section 221 (see FIG. 4) operates to feed a proper sheet, and to read the image data 255 from the page memory through the data processing circuit board 251 (see FIG. 3) at a predetermined timing by supplying the control signal 256 to the data processing circuit board 251. The image data 255 thus read is sent to the data separation unit 261 (see FIG. 4). The data separation unit 261 has a function of distributing the density data in accordance with the sub-color flag. For example, if the sub-color flag is "0," the density data is supplied to the first color image data memory 262 and white data is supplied to the second color image data 263. If the sub-color flag is "1," the density data is supplied to the second color image data memory 263 and white data is supplied to the first color image data memory 262. The printing section performs printing based on the xerography technologies, and includes two developers etc. for the first and second colors. Two color images formed on a photoreceptor (drum) are simultaneously transferred onto a sheet and fixed thereto. Two semiconductor lasers for exposure are also provided for the first and second colors, and drive-controlled by the first-color and second-color laser drive units 264 and 265, respectively in accordance with the image data.

Constitution of image processing portion

The total constitution of the digital copier of the embodiment is described above. In the following, the constitution of an image processing portion used for parallel processing in the embodiment is described.

Figure 1:
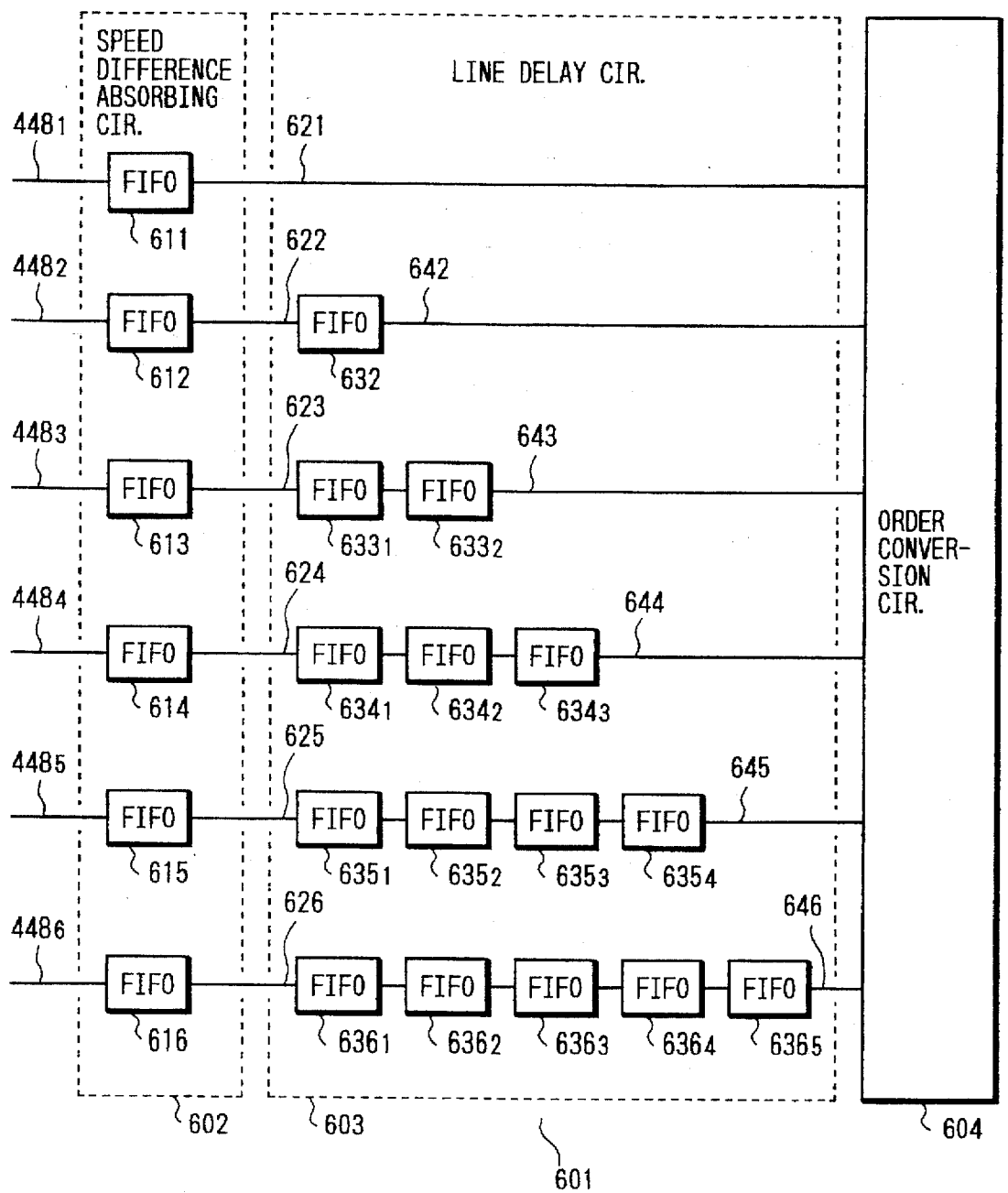
FIG. 1 is a block diagram showing constitution of an image processing portion of a digital copier according to an embodiment of the present invention.

FIG. 1 shows an image processing portion 601 used in the embodiment. The image processing portion 601 consists of a speed difference absorbing circuit 602, a line delay circuit 603 and an order conversion circuit 604. The image processing portion 601 converts the image data divided into the six blocks $b_1$–$b_6$ (see FIG. 15) to the image data suitable for the parallel processing for the respective lines at the first stage of the halftone processing circuit board 238 (see FIG. 19). The block-line parallel conversion unit 451 corresponds to the image processing portion 601.

FIG. 26 shows how the lines of the image data are divided. Symbol 1-1 denotes the first block $b_1$ of the first line $L_1$. Symbol 1-2 denotes the second block $b_2$ of the first line $L_1$. Symbol 2-1 denotes the first block $b_1$ of the second line $L_2$. The same notation applies to the remaining data.

The speed difference absorbing circuit 602 of FIG. 1 has first to sixth FIFO memories 611–616 which correspond to the first to sixth blocks $b_1$–$b_6$, respectively. The first FIFO memory 611 receives image data $448_1$ of the first block $b_1$ from the digital filter circuit board 237 (see FIG. 18). The second FIFO memory 612 receives image data $448_2$ of the second block $b_2$. Similarly, the sixth FIFO memory 616 receives image data $448_6$ of the sixth block $b_6$.

The speed difference absorbing circuit 602 absorbs a difference between the transfer rate of the input image data $448_1$–$448_6$ and the processing speed of the subsequent circuits. More specifically, in the embodiment, the transfer rate of the intermittently provided image data $448_1$–$448_6$ is 12 MHz and the subsequent circuits have a slightly lower processing speed of 11.5 MHz. The FIFO memories 611–616 for the respective blocks (channels) absorb the above speed difference between the input and output sides to avoid missing of data.

The line delay circuit 603 has FIFO memories in different numbers for the respective channels to change the delays of the respective channels step by step. That is, first channel image data 621 output from the first FIFO memory 611 is input to the order conversion circuit 604 without receiving any delay. Second channel image data 622 output from the second FIFO memory 612 is input, as image data 642, to the order conversion circuit 604 after being delayed by one FIFO memory 632 by a predetermined delay time. Third channel image data 623 output from the third FIFO memory 613 is input, as image data 643, to the order conversion circuit 604 after being delayed by two FIFO memories $633_1$ and $633_2$ by twice the predetermined delay time. Similarly, sixth channel image data 626 output from the sixth FIFO memory 616 is input, as image data 646, to the order conversion circuit 604 after being delayed by five FIFO memories $636_1$–$636_5$ by five times the predetermined delay time.

The delay time of each of the FIFO memories 632, $633_1$, $633_2$, $634_1$, . . . , $636_5$ is set equal to a time required for processing data of one block (or a time corresponding to a data amount of one block). Thus, the image data reaches the order conversion circuit 604 in the following manner. (1) First, the first channel image data 621 of one block comes in. (2) Then, the second channel image data 642 of one block comes in immediately after the image data 621. (3) The third channel image data 643 of one block comes in immediately after the image data 642. Similarly, (4) the fourth channel image data 644, (5) fifth channel image data 645 and (6) sixth channel image data 646 sequentially reach the order conversion circuit 604. The order conversion circuit 604 returns the divided image data of 6 blocks $b_1$ –$b_6$ to line-format image data by sequentially selecting the image data 621, 642, . . . , 646 in this order. In this manner, the image processing portion 601 of the embodiment converts the parallel inputs of 6 blocks to the parallel outputs of 4 lines.

Figure 27:
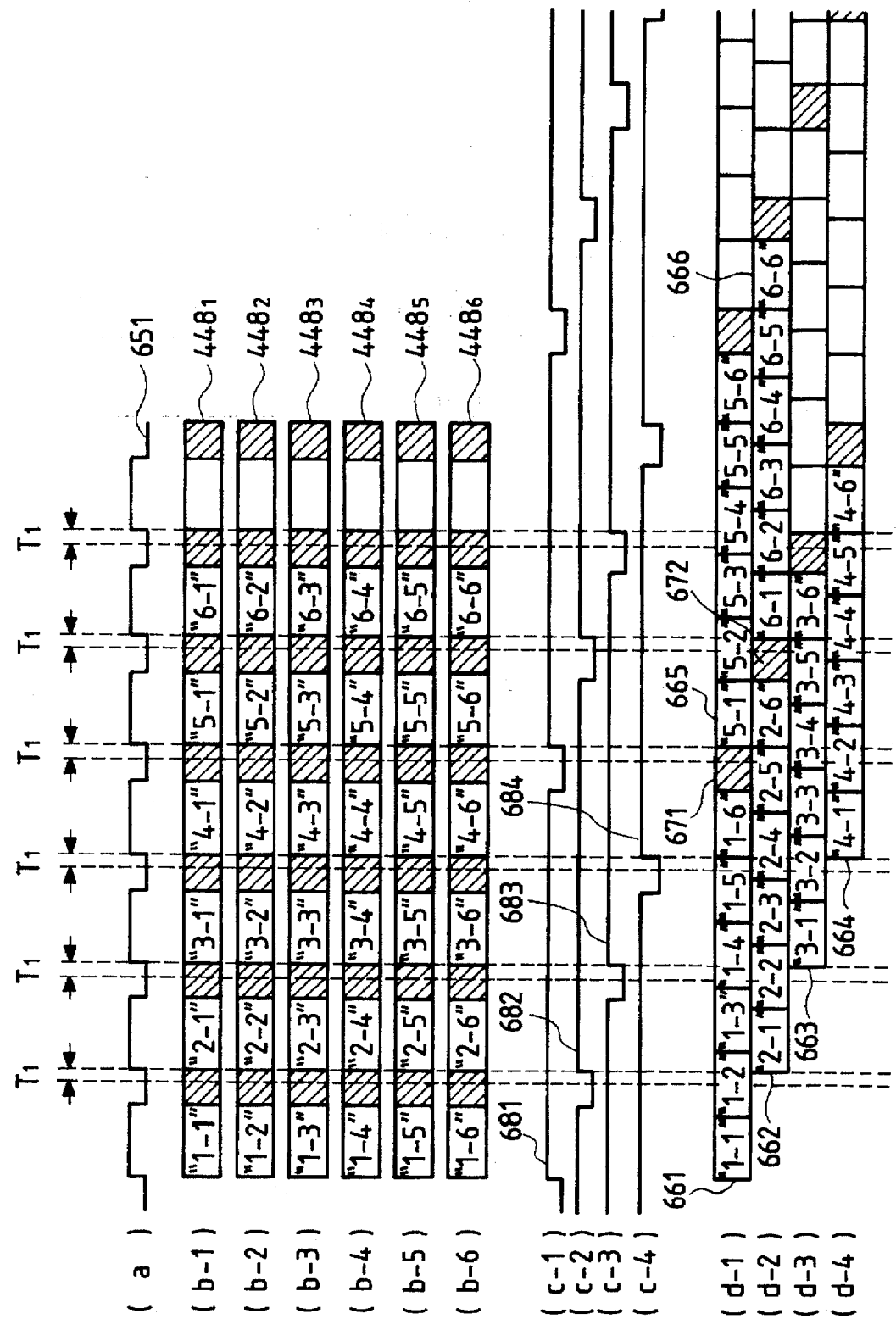
FIG. 27 is a timing chart showing timings of conversion from 6-block parallel inputs to 4-line parallel outputs in the embodiment.

FIG. 27 shows timings of the process of converting the parallel inputs of 6 blocks to the parallel outputs of 4 lines. In FIG. 27, parts (b-1) to (b-6) show timings of transferring the image data $448_1$–$448_6$ of the respective blocks (see FIG. 26) to the image processing portion 601. Part (a) shows a sync signal 651 used for this transfer. As shown in FIG. 27, the image data $448_1$–$448_6$ of the scanning lines are transferred on a block-by-block basis in synchronism with the single sync signal 651.

Part (d-1) of FIG. 27 shows how the image data of the first line is reconstructed by the order conversion circuit 604 and sent out therefrom. As described above, the order conversion circuit 604 reconstructs first line image data 661 from the sequentially provided image data 621, 642, 643, . . . , 646 of the first to sixth channels and sends out the reconstructed image data 661. Parts (d-2), (d-3) and (d-4) show reconstructed second line image data 662, third line image data 663 and fourth line image data 664, respectively. Since the image data of the 6 blocks $b_1$–$b_6$ are rearranged into the image data of 4 lines, image data 665 (see part (d-1)) of the fifth line $L_5$ is placed after the image data 661. The head block, i.e., first block $b_1$ of the image data 665 is incorporated at a timing identical to or later than the timing of the same block in part (b-1). Therefore, a predetermined blank period 671 is interposed between the end of the image data 661 of the first line $L_1$ and the beginning of the image data 665 of the fifth line $L_5$.

Similarly, as shown in part (d-2) of FIG. 27, image data 666 of the sixth line $L_6$ is placed after image data 662 of the second line $L_2$ with a predetermined blank period 672 interposed in between.

The image data 662 of the second line $L_2$ (part (d-2) of FIG. 27) is output a predetermined period after the image data 661 of the first line $L_1$ (part (d-1) of FIG. 27). Image data 663 of the third line $L_3$ (part (d-3)) is output the same period after the image data 662 of the second line $L_2$. Image data 664 of the fourth line $L_4$ (part (d-4)) is output the same period after the image data 663 of the third line $L_3$. This is so because the image data 662, 663 and 664 cannot be reconstructed before the timings of the head blocks 2-1, 3-1 and 4-1 of those lines in part (b-1).

For the above reason, the image data 661 of the first line $L_1$ is output in synchronism with a first sync signal 681 (see part (c-1)), and the image data 662 of the second line $L_2$ is output in synchronism with a second sync signal 682 (see part (c-2)) that is delayed from the first sync signal 681 by the predetermined period mentioned above. Further, the image data 663 of the third line $L_3$ is output in synchronism with a third sync signal 683 (see part (c-3)) that is delayed from the sync signal 682 by the same predetermined period, and the image data 664 of the fourth line $L_4$ is output in synchronism with a fourth sync signal 684 (see part (c-4)) that is delayed from the third sync signal 683 by the same predetermined period.

Periods $T_1$ indicated by dashed lines in FIG. 27 are quiescent periods. As seen from part (a) and parts (b-1) to (b-6), the quiescent periods $T_1$ are set at intervals between the periods during which the image data of the scanning lines are parallel processed in a block-by-block basis. In the quiescent periods $T_1$, the process of parallel outputting the image data of 4 lines (see parts (d-1) to (d-4)) is also stopped. The quiescent period $T_1$ is the 1-block processing cycle of the 6-block parallel processing minus the 1-line processing period of the 4-line parallel processing divided by 4.

In a system in which conversion to 4-line data is performed in synchronism with a common sync signal, a quiescent period common to the four lines can be provided in the final section of each common cycle. On the other hand, for the reason described above, the image data of the respective lines are not in synchronism with each other in the parallel processing of the embodiment. Therefore, in the embodiment, the quiescent periods $T_1$ as described above are provided and the entire data processing for the 4 lines is stopped during the periods $T_1$, to keep the data processing sequence in the subsequent stage unchanged.

Figure 28:
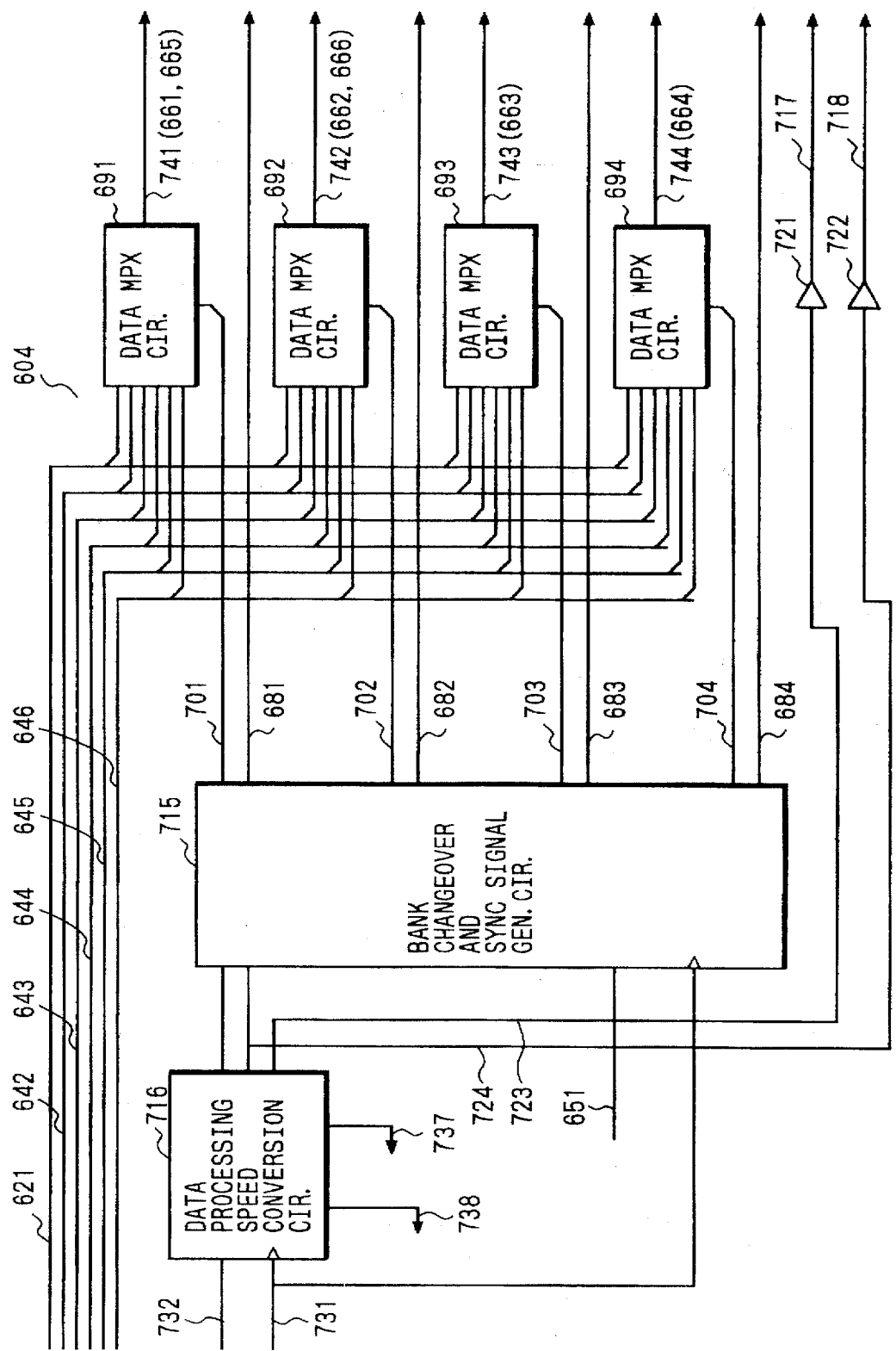
FIG. 28 is a block diagram showing a specific configuration of an order conversion circuit of the embodiment.

FIG. 28 shows a specific configuration of the order conversion circuit 604. Each of first to fourth data multiplexer circuits 691–696 receives the image data 621, 642, 643, . . . , 646 of the first and sixth channels. A bank changeover and sync signal generation circuit 715 supplies selection signals 701–704 and sync signals 681–684 to the respective data multiplexer circuits 691–694. A data processing speed conversion circuit 716 is provided upstream of the bank changeover and sync signal generation circuit 715. Inverters 721 and 722 produce a speed difference absorbing FIFO control signal 717 and a data processing quiescence signal 718 based on output signals 723 and 724 of the data processing speed conversion circuit 716, respectively.

The data processing speed conversion circuit 716 performs sequence control of the entire order conversion circuit 604. That is, given a clock signal 731 the data processing speed conversion circuit 716 produces the signals 723 and 724 to be used for the generation of the speed difference absorbing FIFO control signal 717 and the data processing quiescence signal 718, and a sync signal 732 for taking synchronization between the signals read from the first to sixth FIFO memories 611–616 of the speed difference absorbing circuit 602 (see FIG. 1). The data processing quiescence signal 718 is used to set the quiescent period $T_1$ (see FIG. 27). The data processing quiescence signal 718 becomes active during the period of the 1-block processing cycle of the 6-block parallel processing minus the 1-line processing period of the 4-line parallel processing divided by 4. That is, the quiescent period $T_1$ is a difference between the processing time corresponding to the input speed and the actual data processing time.

The data processing quiescence signal 718 is sent to the data processing circuits such as the reduction/enlargement unit 452 (see FIG. 19). In those data processing circuits, the data processing is stopped during the quiescent period $T_1$. In actual constitution, the data processing quiescence signal 718 and the operation clock signal are ANDed, and a resulting clock signal having additional fall portions is used as the operation clock signal for the subsequent circuits.

The reduction/enlargement operation in the reduction/enlargement unit 452 and the error spread operation and other operations in the subsequent circuits are performed in a 4-line-parallel manner. However, as described in connection with parts (d-1) to (d-4) of FIG. 27, the image data of the respective lines are not in synchronism with each other. As already mentioned above, the quiescent period $T_1$ is provided to keep the data processing sequence in the subsequent stage unchanged.

Now, we return to the description of the data processing speed conversion circuit 716. A line delay FIFO reset signal 737 and a line delay FIFO enable signal 738 are also generated by the data processing speed conversion circuit 716, and supplied to the line delay circuit 603 for its control. To simplify the description, the signals 737 and 738 are not described here but described later in connection with a circuit of a modification of the embodiment.

In addition to a clock signal 731, the sync signal 651 of the block processing is input to the bank changeover and sync signal generation circuit 715. Sequentially synchronized with the respective pulses of the sync signal 651, the bank changeover and sync signal generation circuit 715 outputs the first to fourth sync signals 681–684. While each of the sync signals 681–684 is output, the bank changeover and sync signal generation circuit 715 sequentially generates the selection signals 701–704 and rearranges the image data $448_1$–$448_6$ of the scanning lines (see FIG. 27) to produce the image data 661–666. That is, the data multiplexer circuits 691–694 serve as barrel shift circuits for outputting the image data after rearranging those.

For example, in the first data multiplexer circuit 691, when the sync signal 681 (see part (c-1) of FIG. 27) is generated in synchronism with the sync signal 651 (see part (a)), switching is made among the image data $448_1$–$448_6$ (see (b-1) to (b-6)) in accordance with the selection signal 701. As a result, the image data 661 as shown in part (d-1) is output from the first data multiplexer circuit 691 as the first image data 741. Similarly, the second to fourth data multiplexer circuits 692–694 outputs the second to fourth image data 742–744, respectively.

In the digital copier of the embodiment, it is now assumed that one line of a document is read while it is divided into 14,400 pixels. Since the one line data is divided into the 6 blocks $b_1$–$b_6$ (see FIG. 1), the number of pixels per block is 2,400. In the 6-block parallel processing, the one-line data is processed during the one cycle of the sync signal 651. The one block data of 2,400 pixels should be processed during this cycle. The frequency of the operation clock signal is so set as to satisfy this requirement. If the time of processing the data of 2,400 pixels in accordance with this operation clock signal is shorter than the one cycle, the difference becomes the quiescent period $T_1$ of the 6-block parallel processing. The quiescent periods $T_1$ are hatched in FIG. 27.

On the other hand, after the conversion to the 4-line parallel processing, the sync signals 681–684 are deviated from each other (see parts (c-1) to (c-4)). The sync signals 681–684 have the same cycle for the respective channels. The quiescent period $T_1$ that is common to the 4 lines of FIG. 27 is generated after 2,400 clocks of the operation clock signal of the 4-line parallel processing are counted from the input of the sync signal 651, and canceled when the sync signal 651 for the next line is input.

Figure 29:
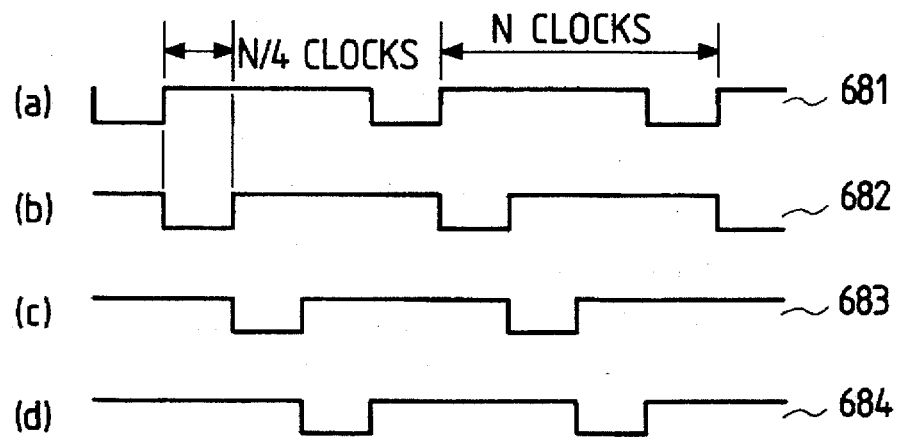
FIG. 29 is a timing chart showing deviations in synchronization between the data of respective channels in 4-line parallel processing of the embodiment.

FIG. 29 shows deviations in synchronization between the respective channels of the 4-line parallel processing. If the number of operation clocks in one cycle is represented by N, the sync signals 681–684 respectively shown in parts (a)–(d) of FIG. 29 are sequentially deviated by N/4 clocks in their sequence. The clocks are counted excluding the quiescent period $T_1$.

Halftone processing

Next, the halftone processing after the conversion to the 4-line parallel data is described below. In the digital copier of the embodiment, a selection can be made from the above-described conversion-to-4-value process using a dither matrix, the error spread process and the simple binary method in accordance with an operator's request.

Figure 30:
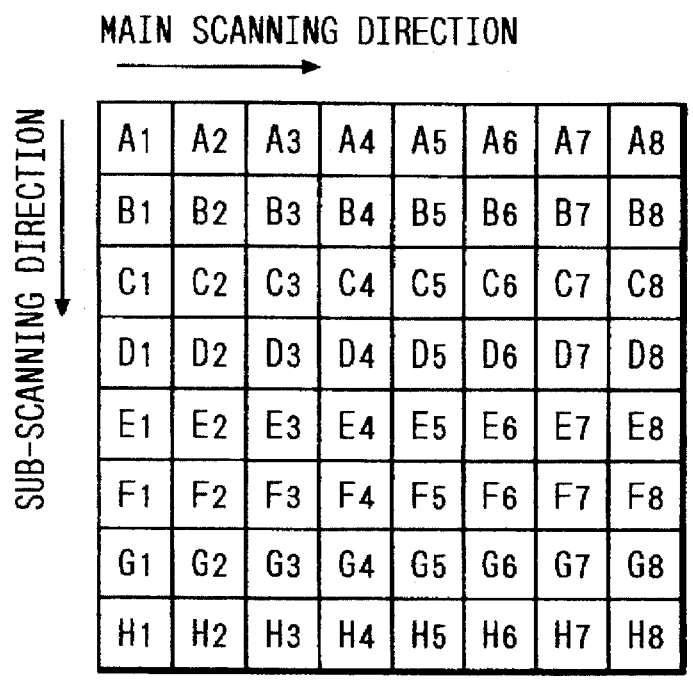
FIG. 30 shows an 8×8 dither matrix used in the embodiment.

FIG. 30 shows a dither matrix used in the embodiment for simulated reproduction of halftone. An 8×8 dither matrix is used, and threshold values are represented by subscripts "1" to "8" in the main scanning direction and by alphabet characters "A" to "H" (like $A_1$–$H_1$) in the sub-scanning direction.

Figure 31:
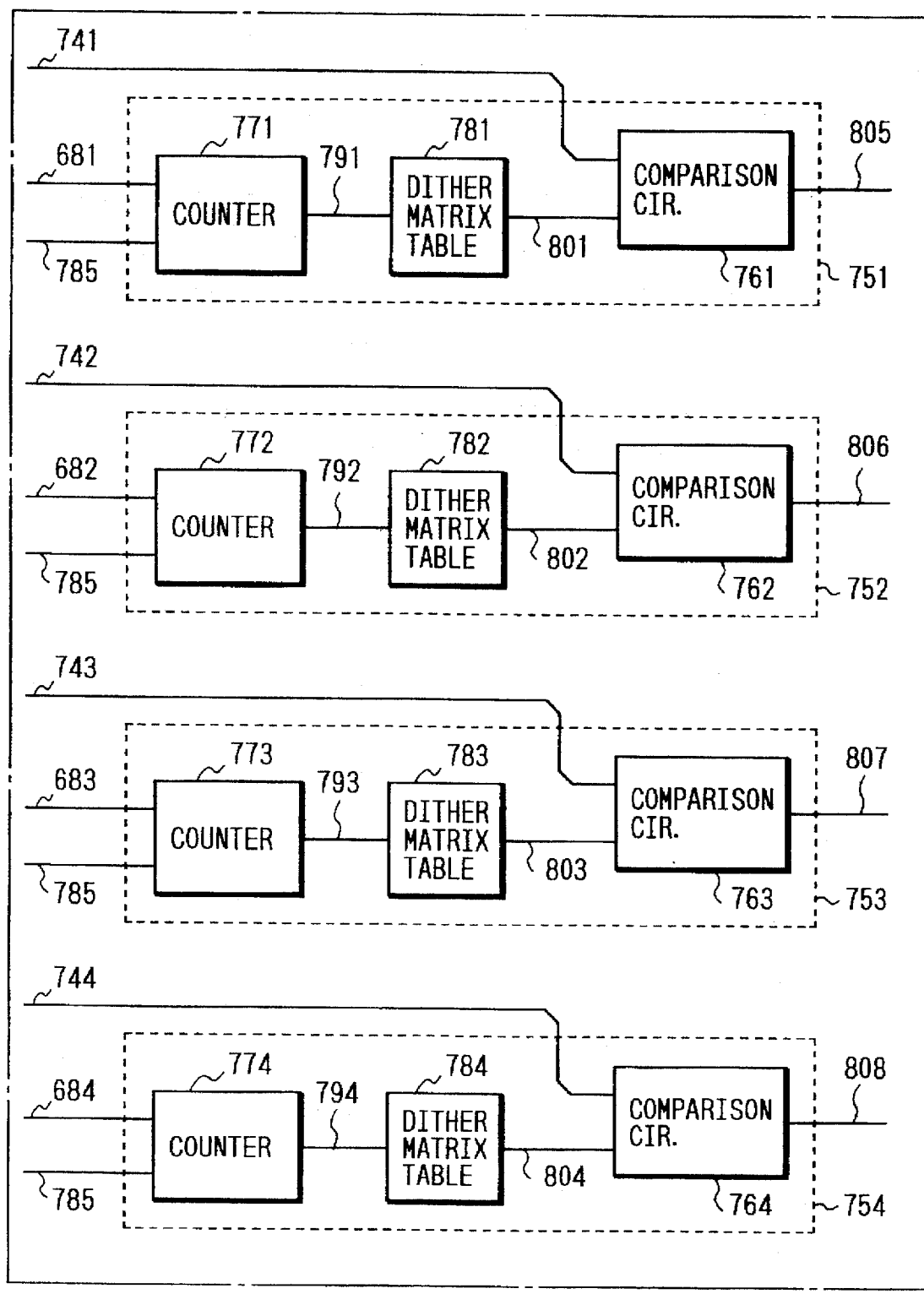
FIG. 31 is a block diagram showing constitution of a halftone processing portion of the embodiment using the dither matrix.

FIG. 31 shows constitution of a halftone processing portion using the dither matrix. The first to fourth image data 741–744 output from the first to fourth data multiplexer circuits 691–694 (see FIG. 28) serve as one input of comparison circuits 761–764 of first to fourth halftone processing circuits 751–754, respectively. The first to fourth halftone processing circuits 751–754 consist of counters 771–774, dither matrix tables 781–784 and comparators 761–764, respectively. The sync signals 681–684 (see FIG. 27) and a common video clock signal 785 (clocks correspond to respective pixels) are supplied to the counters 771–774. Each of the counters 771–774 counts clocks of the video clock signal 785 from the rise of the corresponding one of the sync signals 681–684, and clears the count at the fall of the corresponding sync signal.

Count values 791–794 output from the counter 771–774 are used as address information for the corresponding dither matrix tables 781–784, and threshold data 801–804 to be used as threshold values for the binarization are read out from the dither matrix tables 781–784.

Figures 32, 33, 34, 35, 36:
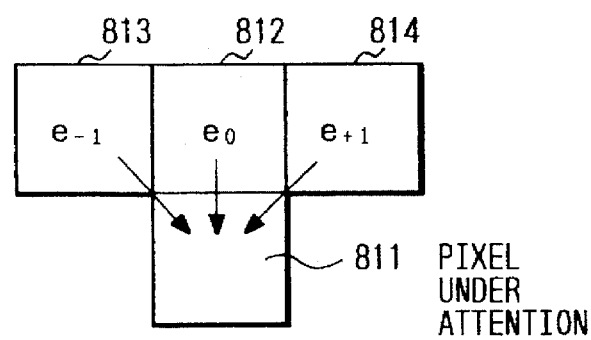
FIGS. 32–35 show partial dither matrices used in first to fourth halftone processing circuits of the embodiment, respectively.
FIG. 36 shows the principle of error spread processing in the embodiment.

FIGS. 32–35 show constitution of dither matrices used in the first to fourth halftone-processing circuits 751–754. While the entire dither matrix has the constitution shown in FIG. 30, in the embodiment the threshold data 801–804 are read out for the respective image data 741–744 that have been converted to 4-line parallel data. Therefore, it suffices that the first halftone processing circuit 751 alternately uses the threshold data $A_1$–$A_8$ of the first row of the entire dither matrix and the threshold data $E_1$–$E_8$ of the 5th row. That is, the partial dither matrix shown in FIG. 32 is sufficient. Similarly, the partial dither matrices shown in FIGS. 33–35 are contents of the dither matrix tables 782–784, respectively. In other words, the individual dither matrix tables of the first to fourth halftone processing circuits 751–754 are obtained by dividing the dither matrix of FIG. 30 into 4 partial matrices.

Comparing the image data 741 with the threshold data 801, the first halftone processing circuits 751 outputs, as the comparison result, image data 805 which takes 4 values of white, first gray, second gray and black. Similarly, comparing the image data 742 with the threshold data 802, the second halftone processing circuit 752 outputs, as the comparison result, 4-value-converted image data 806. Comparing the image data 743 with the threshold data 803, the second halftone processing circuit 753 outputs, as the comparison result, 4-value-converted image data 807. Comparing the image data 744 with the threshold data 804, the second halftone processing circuit 754 outputs, as the comparison result, 4-value-converted image data 808.

Next, the error spread processing in the embodiment is described. In the error spread processing, input densities are averaged in a region having a certain area. The image data representing densities of individual pixels is classified into white, relatively light, first gray, relative dark, second gray and black, and is recorded on a pixel-by-pixel basis according to the area gradation method. Usually, the density of each recorded pixel is not perfectly equal to the density specified by the actual image data; that is, a density error occurs. The error spread processing adjusts densities in the recording so that the density errors are adjusted and disappear in a region having a predetermined area.

FIG. 36 illustrates the principle of the error spread processing. In the error spread processing, error data representing errors of pixels in the vicinity of a pixel 811 under attention (a pixel now going to be processed) are multiplied by respective predetermined coefficients, and then added to the density of the pixel 811 under attention. In the case of FIG. 36, error data $e_0$ of a pixel 812 at the same position as the pixel 811 under attention in the main scanning direction on the preceding line, error data $e_{-1}$ of a pixel 812 immediately preceding the pixel 812 and error data $e_{+1}$ of a pixel 814 immediately following the pixel 812 are multiplied by respective predetermined coefficients and then added to the density of the pixel 811 under attention. The thus-adjusted density is subjected to, for instance, the above-described judgment for the classification into the four values. While in the embodiment values derived from errors of three pixels are added to the density of the pixel 811 under attention, values derived from errors of more pixels may be added to the density of the pixel 811.

Figure 37:
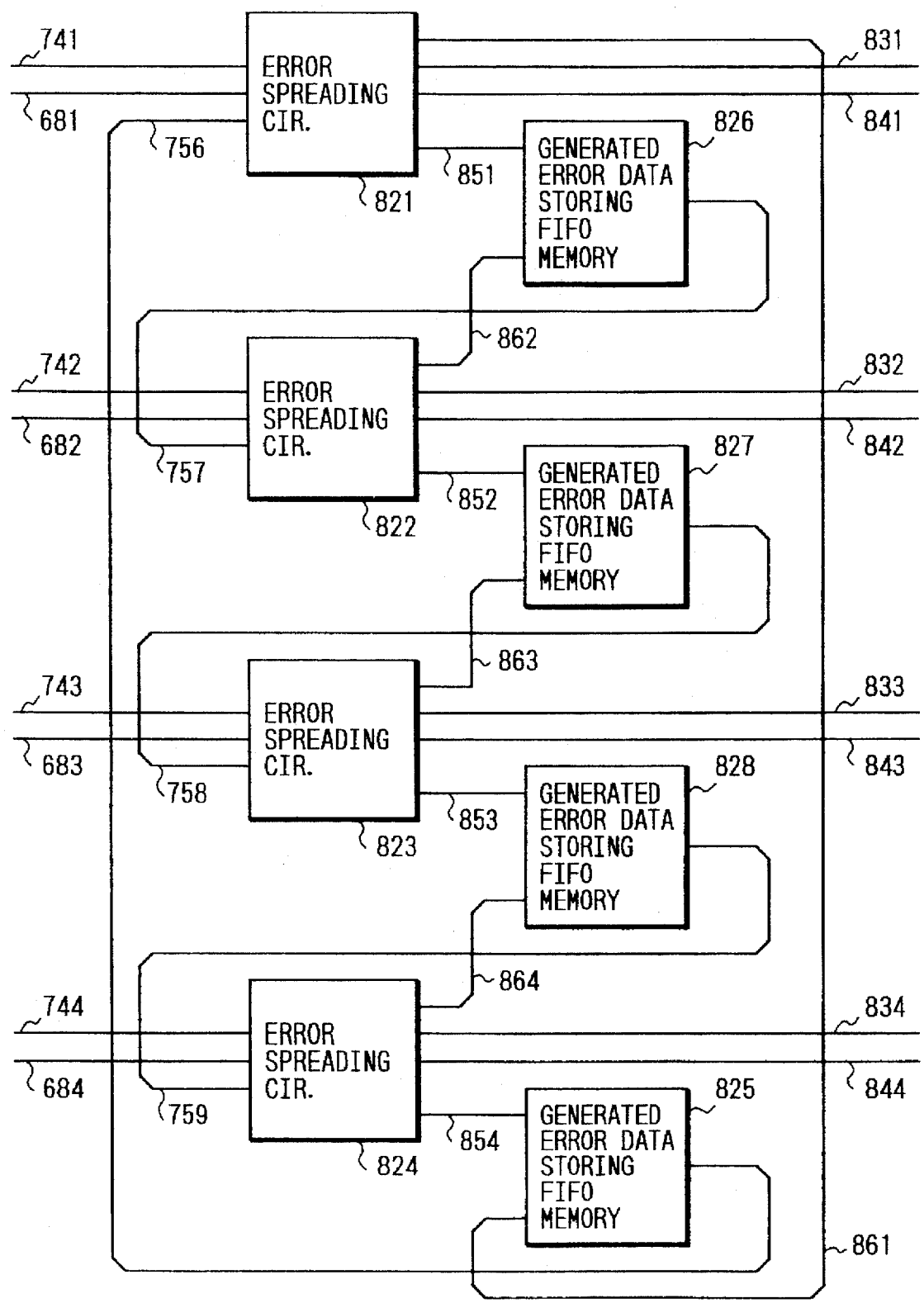
FIG. 37 is a block diagram showing constitution of an error spread processing portion of the embodiment.

FIG. 37 shows constitution of an error spread processing portion used in the embodiment. The error spread processing portion has first to fourth error spreading circuits 821–824, which respectively receive the image data 741–744 which have been converted to 4-line parallel data, sync signals 681–684 and preceding line difference data 756–759. The preceding line difference data 756–759 are output from generated error data storing FIFO memories 825–828 for the preceding lines.

The first error spreading circuit 821 receives the image data 741 and the preceding line difference data 756 as the error data for the preceding line in synchronism with the sync signal 681, performs error spread processing, and outputs resulting image data 831 and corresponding sync signal 841. Similarly, the second to fourth error spreading circuits 822–824 receive the image data 742–744 and the preceding line difference data 757–759 as the error data for the preceding line in synchronism with the sync signals 682–684, performs error spread processing, and output resulting image data 832–834 and corresponding sync signals 842–844, respectively.

A residual error of the error spread processing by the first error spreading circuit 821 is input to the generated error data storing FIFO memory 826 as difference data 851, and delayed so as to match the image data 742 of the next line to thereby become the preceding line difference data 757, which is input to the second error spreading circuit 822. Similarly, residual errors of the error spread processing by the second to fourth error spreading circuits 822–824 are input to the generated error data storing FIFO memories 827, 828 and 825 as difference data 852–854, and delayed so as to match the image data 743, 744 and 741 to thereby become the preceding line difference data 758, 759 and 756, which are input to the third, fourth and first error spreading circuits 823, 824 and 821, respectively. A FIFO read control signal 861 is supplied from the first error spreading circuit 821 to the generated error data storing FIFO memory 825. FIFO read control signals 862–864 are supplied from the second to fourth error spreading circuits 822–824 to the generated error data storing FIFO memories 826–828 for the preceding line, respectively.

Thus, the halftone-processed image data 831–834 are generated by the first to fourth error spreading circuits 821–824, and the difference data 851–854 generated in the halftone processing are temporarily stored in the generated error data storing FIFO memories 826–828 and 825 and used in the error spread processing for the next lines.

In the error spread processing portion of FIG. 37, the data of the respective channels are sequentially deviated by N/4 clocks as shown in FIG. 29. Therefore, the generated error data storing FIFO memories 826–828 and 825 need not be of such a large scale as is suitable for storing the one-line difference data 851–854; that is, it is sufficient that they have stages corresponding to pixels of at least ¼line. If the data of the respective channels were not sequentially deviated, i.e., completely synchrohized with each other, it would be necessary for the generated error data storing FIFO memories 826–828 and 825 to store the difference data 851–854 of one line, resulting in a cost increase. The technique of deviating the data of the respective channels in performing the 4-line parallel processing contributes to the decrease of component costs.

Conversion from 4-line parallel processing to 1-line processing

Next, a description is made of a conversion from the 4-line parallel processing to 4-pixel parallel, 1-line processing. After completion of the halftone processing etc., the image data having the signal form in which the parallel data of four lines sequentially deviate by the predetermined period to image data having the signal form in which the data exist line by line. This operation is performed because it is preferable that the image data be processed on a line-by-line basis from the viewpoint of managing the address information when finally storing the image data into a page memory to effect the image recording. In the embodiment, to increase the processing speed, the 4-line parallel image data is converted to the line-by-line image data by processing data of 4 pixels as one unit.

Figure 38:
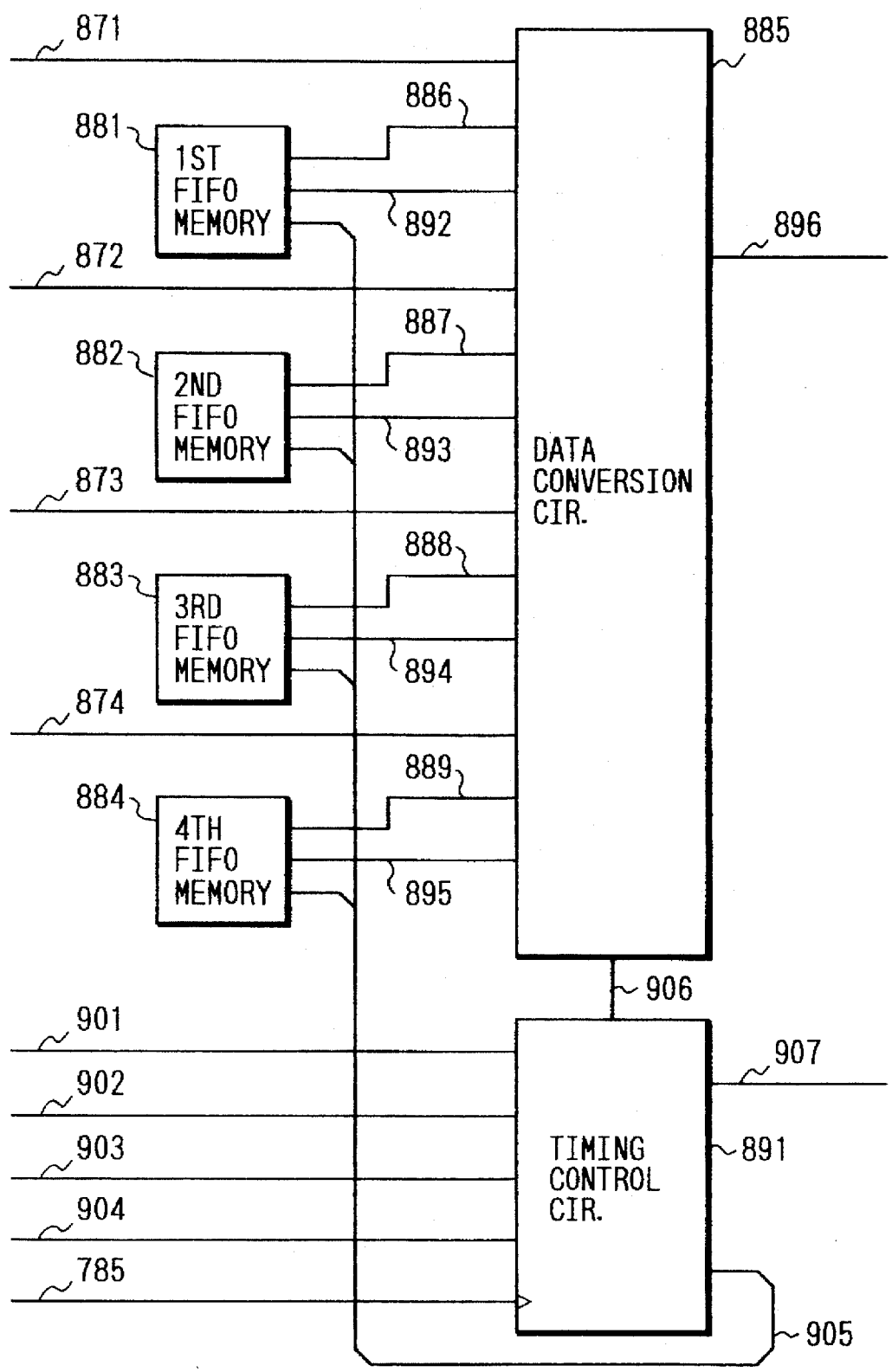
FIG. 38 is a block diagram showing a circuit for conversion from the 4-line parallel processing to 4-pixel parallel, 1-line processing.

FIG. 38 shows a circuit for the conversion from the 4-line parallel processing to the 4-pixel parallel, 1-line processing.

This conversion circuit consists of a data conversion circuit 885 for receiving parallel image data 871–874 of 4 lines, first to fourth FIFO memories 881–884 for receiving image data 886–889 which have been converted to 4-pixel parallel data by the data conversion circuit 885, and a timing control circuit 891 for controlling the timing.

The data conversion circuit 885 performs data conversion on image data 892–895 received from the first to fourth FIFO memories 881–884, and outputs converted image data 896. The timing control circuit receives a video clock signal 785 and the sync signals 681–684 (see FIG. 27) or four kinds of sync signals 901–904 which result from the sync signals 681–684 by delay during the processing, and outputs a sync signal 905 for the first to fourth FIFO memories 881–884, a sync signal 906 for the data conversion circuit 889 and a sync signal 907 for the converted image data 896.

Figures 39, 41:
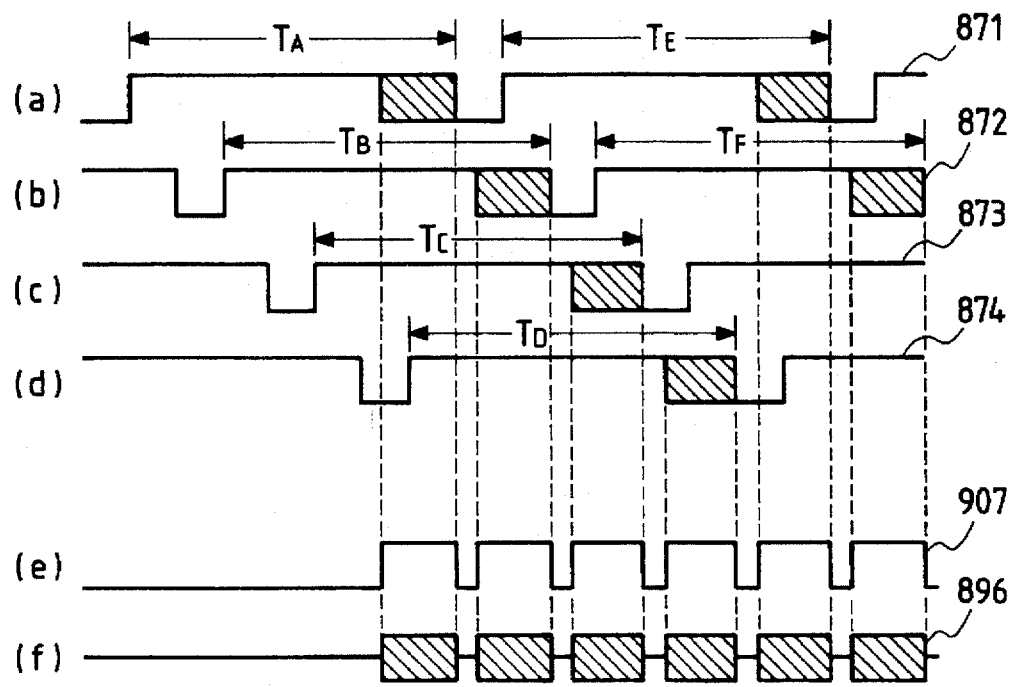
FIG. 39 is a timing chart of the conversion by the circuit of FIG. 38.
FIG. 41 shows how the image data of respective lines are divided in the modification.

Referring to FIG. 39, a description is made of how the conversion circuit of FIG. 38 performs the conversion from the 4-line parallel processing to the 4-pixel parallel, 1-line processing. During periods $T_A$–$T_D$ shown in parts (a)–(d) of FIG. 39, the image data 871–874 of Ath, Bth, Cth and Dth lines (they are consecutive lines) are input to respective input terminals of the data conversion circuit 885.

The data conversion circuit 885 has a serial-to-parallel conversion function for rearranging the image data 871–874, which are sequentially supplied on a pixel-by-pixel basis, into the 4-pixel parallel data. By the serial-to-parallel conversion function, the image data 871–874 of the Ath to Dth lines are rearranged and stored into the first to fourth FIFO memories 881–884 as the image data 886–889.

The first FIFO memory 881 is described below in more detail. Like the image data 661 shown in part (d-1) of FIG. 27, the image data 886 starts to be stored into the first FIFO memory 881 before the other image data 887–889 (662–664; see parts (d-2) to (d-4)) of FIG. 27). At the time point when ¾ of the image data 661 of one line has been stored into the first FIFO memory 881, the sync signal 907 rises as shown in part (e) of FIG. 39. At this timing, the image data 892 starts to be read out from the first FIFO memory 881 at four times the speed of the writing. The image data 892 thus read is input to the data conversion circuit 885.

Similarly, the image data 893 starts to be read out from the second FIFO memory 882 at the time point when ¾ of the image data 887 of one line has been written thereto. Therefore, the ends of the writing and reading of the image data 887 of one line coincide with each other. The input and output processing of the image data 888 and 889 with the third and fourth FIFO memories 883 and 884, respectively, is performed in the similar manner.

When the reading of the image data 895 from the fourth FIFO memory 884 has finished, the reading of the image data 892 from the first FIFO memory 881 is restarted. This time, the 1-line data of a period $T_E$ (see FIG. 39 part (a)) is a subject of the processing. In the similar manner, the image data 871–874 of the respective lines processed, and the image data 892–895 are supplied from the first to fourth FIFO memories 881–884 to the data conversion circuit 885.

The data conversion circuit 885 combines the 4-pixel parallel image data 892–895, which are supplied with no overlap (see parts (a)–(d) of FIG. 39), and outputs the converted image data 896 (part (f) of FIG. 39) in synchronism with the sync signal 907 (part (e)) of FIG. 39) output from the timing control signal 907. The sync signal 907 is active for the respective lines of the 4-pixel parallel image data 896. Since the image data 896 is has a 4-pixel parallel form, the operation clock signal for the 4-line parallel processing can also be used for the image data 896 as it is.

The image data 896 output from the data conversion circuit 885 is sent to the page memory circuit board 253 and written to the page memory (not shown).

In the embodiment described above, as shown in FIG. 39, the image data 871–874 are not directly input to the first to fourth FIFO memories 881–884, but are input to those memories after being converted to the 4-pixel parallel data. This contributes to the speed-up of the image processing.

Modification

In the above embodiment, the data obtained by reading the document 306 is divided into the 6 blocks $b_1$–$b_6$ (see FIG. 15) and then converted to the 4-line parallel image data 741–744 by the order conversion circuit 604 (see FIG. 28). The invention is not limited to this case but, for instance, the reading data of the document 306 may be divided into four parts in the main scanning direction and then converted to the 4-line parallel data. The latter case is hereinafter described as a modification of the embodiment.

Figure 40:
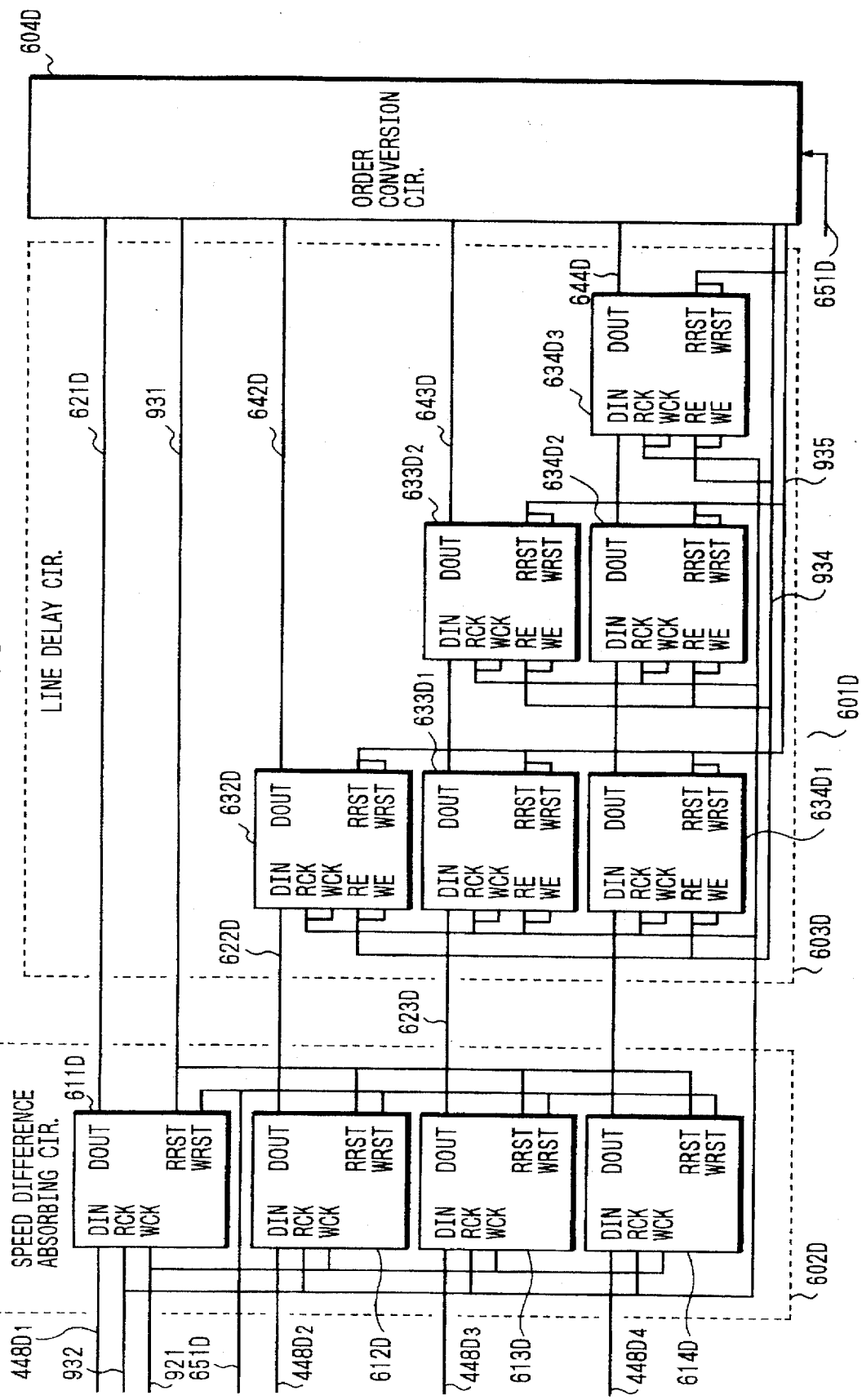
FIG. 40 is a circuit diagram showing an image processing portion according to a modification of the invention.

FIG. 40, corresponds to FIG. 1, shows an image processing portion according to the modification. In the modification, symbols of circuits and signals are produced by adding a character "D" at the end of the symbols of the corresponding parts in the above embodiment (if a symbol ends with a subscript, immediately before the subscript).

An image processing portion 601D of the modification consists of a speed difference absorbing circuit 602D, a line relay circuit 603D and an order conversion circuit 604D. The speed difference absorbing circuit 602D has first to fourth FIFO memories 611D–614D corresponding to first to fourth blocks $bD_1$–$bD_4$, respectively. Image data $448D_1$ of the first block $bD_1$ output from the digital filter circuit board 237 (see FIG. 18) is input to a data input terminal DIN of the first FIFO memory 611D. Image data $448D_2$ of the second block $bD_2$ is input to a data input terminal DIN of the second FIFO memory 612D. Similarly, Image data $448D_3$ and $448D_4$ of the third and fourth blocks $bD_3$ and $bD_4$ are input to the third and fourth FIFO memories 613D and 614D, respectively.

The speed difference absorbing circuit 602D absorbs a difference between the transfer rate of the input side image data $448D_1$–$448D_4$ and the processing speed of the subsequent circuits. That is, also in the apparatus of the modification, while the transfer rate of the intermittently supplied image data $448D_1$–$448D_4$ is 12 MHz, the subsequent circuits have a slightly lower processing speed of 11.5 MHz. The FIFO memories 611D–614D for the respective blocks (channels) absorb the difference in speed between the input and output sides to avoid missing of data.

A sync signal 651D, which is synchronized with the data of the respective channels, is supplied from the preceding circuits to write reset terminals WRST of the first to fourth FIFO memories 611D–614D. A video clock signal (operation clock signal) 921 for the block processing is input to write clock input terminals WCK. Thus, the input image data $448D_1$–$448D_4$ of the first to fourth blocks $bD_1$–$bD_4$ are written to the first to fourth FIFO memories 611D–614D, respectively.

On the other hand, a speed difference absorbing FIFO memory control signal 931 is supplied from the order conversion circuit 604D to read reset terminals RRST of the first to fourth FIFO memories 611D–614D. A read clock signal 932 is supplied from the preceding circuits to read clock terminals RCK. The read clock signal 932 is the operation clock signal for the 4-line parallel processing. The sync signal 651D for the block processing is supplied to the order conversion circuit 604D, based on which the speed difference absorbing FIFO memory control signal 931 is generated.

Image data 621D of the first channel output from an output terminal DOUT of the first FIFO memory 611D is input to the order conversion circuit 604D as it is, i.e., without being delayed by the line delay circuit 603D. Image data 622D of the second channel output from an output terminal DOUT of the second FIFO memory 612D is delayed by one line by one FIFO memory 632D in the line delay circuit 603D, and sent to the order conversion circuit 604D as image data 642D. Image data 623D of the third channel output from an output terminal DOUT of the third FIFO memory 613D is delayed by two lines by two FIFO memories $633D_1$ and $633D_2$, and sent to the order conversion circuit 604D as image data 643D. Image data 624D of the fourth channel output from an output terminal DOUT of the fourth FIFO memory 614D is delayed by three lines by three FIFO memories $634D_1$–$634D_3$, and sent to the order conversion circuit 604D as image data 644D.

The read clock signal 932 is supplied to read clock terminals RCK and write clock terminals WCK of the respective FIFO memories 632D. $633D_1, \ldots, 634D_3$ of the line relay circuit 603D. A line delay and FIFO memory enable signal 934 is supplied from the order conversion circuit 604D to read enable terminals RE and write enable terminals WE. Further, a line delay and FIFO memory reset signal 935 is supplied from the order conversion circuit 604D to read reset terminals RRST and write reset terminals WRST.

FIG. 41, which corresponds to FIG. 26, shows how respective lines of the image data are divided. In FIG. 41, symbol 1-1 denotes the first block $bD_1$ of the first line $L_1$. Symbol 1-2 denotes the second block $bD_2$ of the first line $L_1$. Symbol 2-1 denotes the first block $bD_1$ of the second line $L_2$. The same notation applies to the remaining data.

Figure 42:
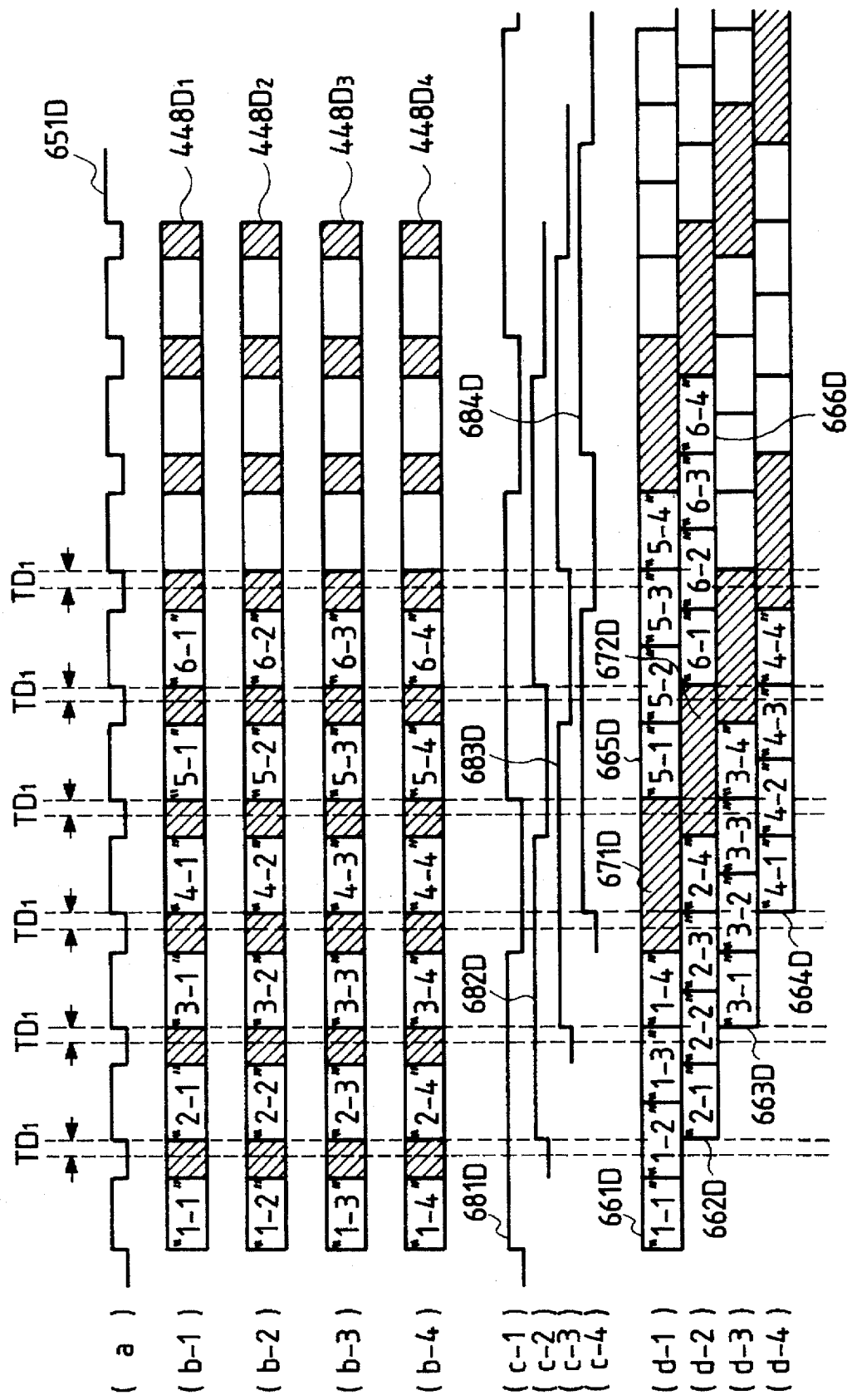
FIG. 42 is a timing chart showing timings of conversion from 4-block parallel inputs to 4-line parallel outputs in the modification.

FIG. 42, which corresponds to FIG. 27, timings of the process of converting the 4-block parallel inputs of the modification to the 4-line parallel outputs. In FIG. 42, parts (b-1) to (b-4) show timings of transferring the image data $448D_1$–$448D_4$ of the respective blocks (see FIG. 41) to the image processing portion 601D. Part (a) shows a sync signal 651D used for this transfer. As shown in FIG. 42, the image data $448D_1$–$448D_4$ of the scanning lines are transferred on a block-by-block basis in synchronism with the single sync signal 651D.

Part (d-1) of FIG. 42 shows how the image data of the first line is reconstructed by the order conversion circuit 604D and sent out therefrom. As described above, the order conversion circuit 604D reconstructs first line image data 661D from the sequentially provided image data 621D, 642D, 643D and 646D of the first to fourth channels and sends out the reconstructed image data 661D. Parts (d-2), (d-3) and (d-4) show reconstructed second line image data 662D, third line image data 663D and fourth line image data 664D, respectively.

Since the image data of the 4 blocks $bD_1$–$bD_4$ are. rearranged into the image data of 4 lines, image data 665D (see part (d-1)) of the fifth line $L_5$ is placed after the image data 661D. The head block, i.e., first block $bD_1$ of the image data 665D is incorporated at a timing identical to or later than the timing of the same block in part (b-1). Therefore, a predetermined blank period 671D is interposed between the end of the image data 661D of the first line $L_1$ and the beginning of the image data 665D of the fifth line $L_5$.

Similarly, as shown in part (d-2) of FIG. 42, image data 666 of the sixth line L6 is placed after image data 662D of the second line $L_2$ with a predetermined blank period 672D interposed in between.

The image data 662D of the second line $L_2$ (part (d-2) of FIG. 42) is output a predetermined period after the image data 661D of the first line $L_1$ (part (d-1) of FIG. 42). Image data 663D of the third line $L_3$ (part (d-3)) is output the same period after the image data 662D of the second line $L_2$. Image data 664D of the fourth line $L_4$ (part (d-4)) is output the same period after the image data 663D of the third line $L_3$. This is so because the image data 662D 663D and 664D cannot be reconstructed before the timings of the head blocks 2-1, 3-1 and 4-1 of those lines in part (b-1).

For the above reason, the image data 661D of the first line $L_1$ is output in synchronism with a first sync signal 681D (see part (c-1)), and the image data 662D of the second line $L_2$ is output in synchronism with a second sync signal 682D (see part (c-2)) that is delayed from the first sync signal 681D by the predetermined period mentioned above. Further, the image data 663D of the third line $L_3$ is output in synchronism with a third sync signal 683D (see part (c-3)) that is delayed from the sync signal 682D by the same predetermined period, and the image data 664D of the fourth line $L_4$ is output in synchronism with a fourth sync signal 684D (see part (c-4)) that is delayed from the third sync signal 683D by the same predetermined period. Periods $TD_1$ indicated by dashed lines in FIG. 42 are quiescent periods.

Figure 43:
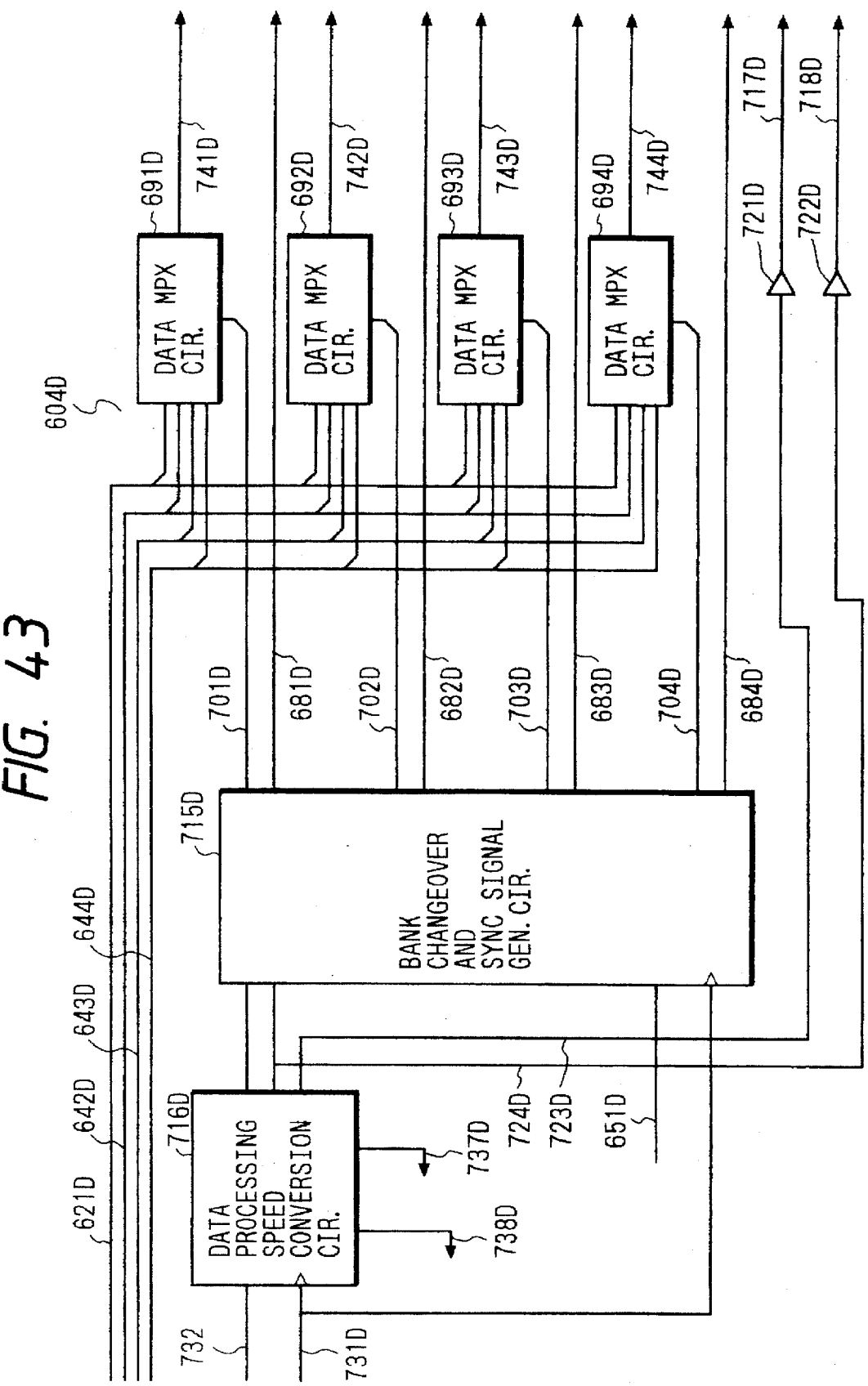
FIG. 43 is a block diagram showing a specific configuration of an order conversion circuit of the modification.

FIG. 43, which corresponds to FIG. 28, shows a specific configuration of the order conversion circuit 604D of the modification. Each of first to fourth data multiplexer circuits 691D–694D receives the image data 621D, 642D, 643D and 644D of the first and fourth channels. A bank changeover and sync signal generation circuit 715D supplies selection signals 701D–704D and sync signals 681D–684D to the respective data multiplexer circuits 691D–694D. A data processing speed conversion circuit 716D is provided upstream of the bank changeover and sync signal generation circuit 715D. Inverters 721D and 722D produce a speed difference absorbing FIFO control signal 717D and a data processing quiescence signal 718D based on output signals 723D and 724D of the data processing speed conversion circuit 716D, respectively.

The data processing speed conversion circuit 716D performs sequence control of the entire order conversion circuit 604D. That is, given a clock signal 731D, the data processing speed conversion circuit 716D produces the signals 723D and 724D to be used for the generation of the speed difference absorbing FIFO control signal 717D and the data processing quiescence signal 718D, and a sync signal 732D for taking synchronization between the signals read from the first to fourth FIFO memories 611D–616D of the speed difference absorbing circuit 602D (see FIG. 40).

The data processing quiescence signal 718D is used to set the quiescent period $TD_1$ (see FIG. 42). The data processing quiescence signal 718D becomes active during the period of the 1-block processing cycle of the 4-block parallel processing minus the 1-line processing period of the 4-line parallel processing divided by 4. That is, the quiescent period $TD_1$ is a difference between the processing time corresponding to the input speed and the actual data processing time.

A line delay and FIFO reset signal 737D and a line delay and FIFO enable signal 738D are also generated by the data processing speed conversion circuit 716D, and are input to the line delay circuit 603D (see FIG. 40) for its control.

In addition to a clock signal 731D, the sync signal 651D of the block processing is input to the bank changeover and sync signal generation circuit 715D. Sequentially synchronized with the respective pulses of the sync signal 651D, the bank changeover and sync signal generation circuit 715D outputs the first to fourth sync signals 681D–684D. While each of the sync signals 681D–684D is output, the bank changeover and sync signal generation circuit 715D sequentially generates the selection signals 701D–704D and rearranges the image data 448D$_1$–448D$_6$ of the scanning lines (see FIG. 42) to produce the image data 661D–666D. That is, the data multiplexer circuits 691D–694D serve as barrel shift circuits for outputting the image data after rearranging those.

For example, in the first data multiplexer circuit 691D, when the sync signal 681D (see part (c-1) of FIG. 42) is generated in synchronism with the sync signal 651D (see part (a)), switching is made among the image data 448D$_1$–448D$_6$ (see (b-1) to (b-4)) in accordance with the selection signal 701D. As a result, the image data 661D as shown in part (d-1) is output from the first data multiplexer circuit 691D as the first image data 741D. Similarly, the second to fourth data multiplexer circuits 692D–694D outputs the second to fourth image data 742D–744D, respectively.

Also in the digital copier of the modification, it is now assumed that one line of a document is read while it is divided into 14,400 pixels. Since the one line data is divided into the 6 blocks bD$_1$–bD$_4$, the number of pixels per block is 3,600. In the 4-block parallel processing, the one-line data is processed during the one cycle of the sync signal 651D. The one block data of 3,600 pixels should be processed during this cycle. The frequency of the operation clock signal is so set as to satisfy this requirement. If the time of processing the data of 3,600 pixels in accordance with this operation clock signal is shorter than the one cycle, the difference becomes the quiescent period TD$_1$ of the 4-block parallel processing. The quiescent periods TD$_1$ are hatched in FIG. 42.

On the other hand, after the conversion to the 4-line parallel processing, the sync signals 681D–684D are deviated from each other (see parts (c-1) to (c-4)). The sync signals 681D–684D have the same cycle for the respective channels. The quiescent period TD$_1$ that is common to the 4 lines of FIG. 42 is generated after 3,600 clocks of the operation clock signal of the 4-line parallel processing are counted from the input of the sync signal 651D, and canceled when the sync signal 651D for the next line is input.

Figure 44:
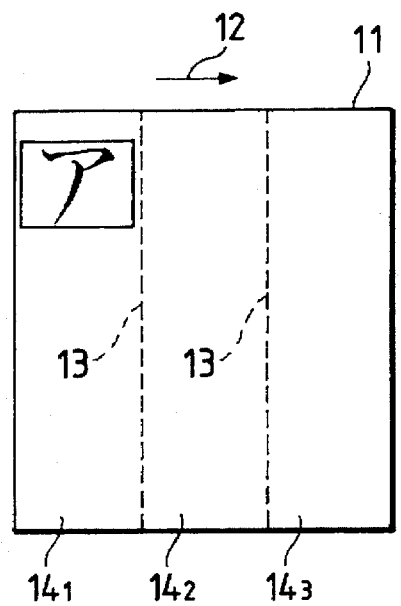
FIG. 44 is a chart showing how image information read from a single document is divided into three blocks.
Figure 45:
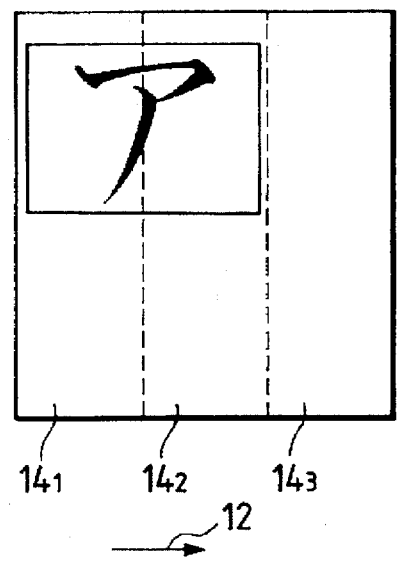
FIG. 45 is a chart showing how an image belonging to the first block of FIG. 44 is enlarged by a factor of 4.
Figure 46:
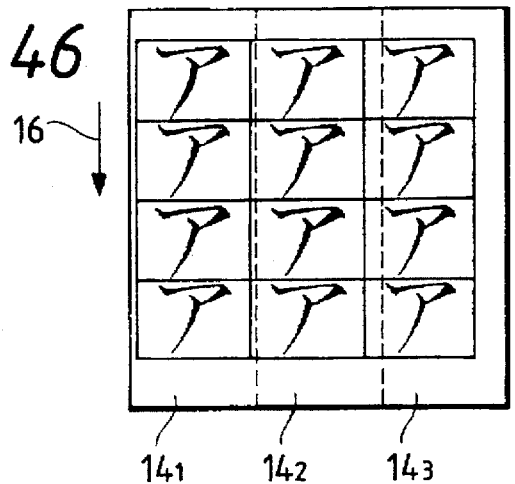
FIG. 46 is a chart showing how a number of images "7" are generated by a repeat function from the original image of FIG. 44.

FIG. 44 is a chart showing how image information read from a single document is divided into three blocks;

FIG. 45 is a chart showing how an image belonging to the first block of FIG. 44 is enlarged by a factor of 4; and FIG. 46 is a chart showing how a number of images are generated by a repeat function from the original image of FIG. 44.

What is claimed is:

1. A parallel processing apparatus comprising:
   dividing means for dividing parallel lines of first image data extending in a main scanning direction and constituting one page, into a plurality of blocks arranged in the main scanning direction to provide a plurality of first data streams;
   first parallel processing means connected to the dividing means for processing the plurality of first data streams in parallel in response to a sync signal, from a sync signal generator, common to the plurality of first data streams, the processing of the plurality of first data streams including digitally altering the data streams by applying a digital image processing function; and
   second parallel processing means connected to the first parallel processing means for rearranging the processed plurality of first data streams into a plurality of second data streams, each including successions of blocks of different first image data lines, and for processing the second data streams in parallel in response to respective second sync signals from the sync signal generator that are sequentially delayed by a predetermined time period.

2. The parallel processing apparatus of claim 1, further comprising means responsive to the first and second parallel processing means for absorbing a difference between data processing speeds of the first and second parallel processing means.

3. The parallel processing apparatus of claim 1, wherein a quiescent period is set which is Ta–Tb/N, where Ta is a cycle time for processing one line in the first parallel processing means, Tb is a time period required for processing one line in one of the second data streams while processing the one of the second data streams in the second parallel processing means, and N is the number of the second data streams, and image data processing in the second parallel processing means is suspended by the quiescent period in synchronism with the cycle for processing one line in the first parallel processing means.

4. The parallel processing apparatus of claim 1, wherein the first parallel processing means further includes means for emphasizing edges in the image.

5. The parallel processing apparatus of claim 1, wherein the first parallel processing means further includes means for smoothing the image.

6. A parallel processing apparatus comprising:
   dividing means for dividing parallel lines of first image data, extending in a main scanning direction and constituting one page, into a plurality of blocks arranged in the main scanning direction to provide a plurality of first data streams;
   first parallel processing means connected to the dividing means for processing the plurality of first data streams in parallel in response to a sync signal, from a sync signal generator, common to the plurality of first data streams, the processing of the plurality of first data streams including digitally altering the data streams by applying a digital image processing function;
   parallel output means connected to the first parallel processing means for rearranging the plurality of processed first data streams into a plurality of second data streams, each including successions of blocks of different first image data lines, and for outputting the second data streams in parallel while sequentially delaying the second data streams by a predetermined time period;
   a plurality of matrix tables including row elements selected from a two-dimensional matrix containing mapped threshold values; and
   means for performing the quasi-halftone processing on the second data streams in parallel using the matrix tables.

7. The parallel processing apparatus of claim 6, wherein the first parallel processing means further includes means for emphasizing edges in the image.

8. The parallel processing apparatus of claim 6, wherein the first parallel processing means further includes means for smoothing the image.

9. A parallel processing apparatus comprising:
   dividing means for dividing parallel lines of first image data, extending in a main scanning direction and constituting one page, into a plurality of blocks arranged in the main scanning direction to provide a plurality of first data streams;
   first parallel processing means connected to the dividing means for processing the plurality of first data streams in response to a sync signal, from a sync signal generator, common to the plurality of first data streams, the processing of the plurality of first data streams including digitally altering the data streams by applying a digital image processing function;

parallel output means connected to the first parallel processing means for rearranging the processed plurality of first data streams into a plurality of second data streams in parallel, each including successions of blocks of different first image data lines, and for outputting the second data streams in parallel while sequentially delaying the second data streams by a predetermined time period; and means provided for respective second data streams, for performing error spread processing on the respective second data streams while obtaining density data of a pixel under attention by adding to original density data of the pixel under attention values derived from errors of already processed density data of pixels on a preceding line.

10. The parallel processing apparatus of claim 9, wherein the first parallel processing means further includes means for emphasizing edges in the image.

11. The parallel processing apparatus of claim 9, wherein the first parallel processing means further includes means for smoothing the image.

12. A parallel processing apparatus comprising:

dividing means for dividing parallel lines of first image data, extending in a main scanning direction and constituting one page, into a plurality of blocks arranged in the main scanning direction to provide a plurality of first data streams;

first parallel processing means connected to the dividing means for processing the plurality of first data streams in parallel in response to a sync signal, from a sync signal generator, common to the plurality of first data streams, the processing of the plurality of first data streams including digitally altering the data streams by applying a digital image processing function;

second parallel processing means connected to the first parallel processing means for rearranging the processed plurality of first data streams into a plurality of second data streams, each including successions of blocks of different lines first image data lines, and for processing the second data streams in parallel in response to respective sync signals, from the sync signal generator, being sequentially delayed by a predetermined time period; and parallel output means for rearranging the second data streams processed by the second parallel processing means into third image data of data lines constituting the one page, and for outputting the third image data one data line after another.

13. The parallel processing apparatus of claim 12, wherein the first parallel processing means further includes means for emphasizing edges in the image.

14. The parallel processing apparatus of claim 12, wherein the first parallel processing means further includes means for smoothing the image.

15. A parallel processing apparatus comprising:

dividing means for dividing an image made up of parallel lines extending in a main scanning direction into a plurality of blocks arranged in the main scanning direction, each said block including a portion of said parallel lines of said image, such that all of said plurality of blocks are required to form a complete one of said parallel lines;

first parallel processing means connected to the dividing means for inputting a plurality of first data streams, each corresponding to one of said blocks, processing the plurality of first data streams in parallel in response to a sync signal, from a sync signal generator, common to the plurality of first data streams, the processing of the plurality of first data streams including digitally altering the data streams by applying a digital image processing function; and second parallel processing means connected to the first parallel processing means for rearranging the processed plurality of first data streams into a plurality of second data streams, each including at least one complete parallel line of said image, and for processing the second data streams in parallel in response to respective second sync signals from the sync signal generator that are sequentially delayed by a predetermined time period.

16. The parallel processing apparatus of claim 15, wherein the first parallel processing means further includes means for emphasizing edges in the image.

17. The parallel processing apparatus of claim 15, wherein the first parallel processing means further includes means for smoothing the image.

* * * * *